(12) United States Patent
Adler et al.

(10) Patent No.: US 11,615,533 B2
(45) Date of Patent: Mar. 28, 2023

(54) METHODS AND SYSTEMS FOR PRODUCT FAILURE PREDICTION BASED ON X-RAY IMAGE RE-EXAMINATION

(71) Applicant: Bruker Nano, Inc., Santa Barbara, CA (US)

(72) Inventors: David Lewis Adler, San Jose, CA (US); Scott Joseph Jewler, San Jose, CA (US); Douglas A. Chrissan, Los Gatos, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 127 days.

(21) Appl. No.: 16/924,706

(22) Filed: Jul. 9, 2020

(65) Prior Publication Data

US 2021/0010954 A1 Jan. 14, 2021

Related U.S. Application Data

(60) Provisional application No. 62/873,752, filed on Jul. 12, 2019.

(51) Int. Cl.
*G06T 7/00* (2017.01)
*G06N 20/00* (2019.01)
(Continued)

(52) U.S. Cl.
CPC .......... *G06T 7/0014* (2013.01); *G01N 23/04* (2013.01); *G01N 23/043* (2013.01);
(Continued)

(58) Field of Classification Search
CPC combination set(s) only.
See application file for complete search history.

(56) References Cited

U.S. PATENT DOCUMENTS 8,135,204 B1 * 3/2012 Chen .................. G01N 21/9501
382/141
9,607,724 B2 3/2017 Adler
(Continued)

FOREIGN PATENT DOCUMENTS

JP 2010127810 A 6/2010
KR 101437125 B1 9/2014

OTHER PUBLICATIONS

International Search Report and Written Opinion for International Application No. PCT/US2020/041514, dated Oct. 20, 2020.
(Continued)

*Primary Examiner* — David P Porta
*Assistant Examiner* — Mamadou Faye
(74) *Attorney, Agent, or Firm* — Boyle Fredrickson S.C.

(57) ABSTRACT

In one embodiment, an X-ray inspection system may access a first set of X-ray images of one or more first samples that are labeled as being non-conforming. The system may adjust a classification algorithm based on the first set of X-ray images. The classification algorithm may classify samples into conforming or non-conforming categories based on an analysis of corresponding X-ray images. The system may analyze a second set of X-ray images of a number of second samples using the adjusted classification algorithm. The second samples may be previously inspected samples that have been classified as conforming by the classification algorithm during a previous analysis before the classification algorithm is adjusted. The system may identify one or more of the second samples from the second set of X-ray images. Each identified second sample may be classified as non-conforming by the adjusted classification algorithm.

35 Claims, 8 Drawing Sheets

(51) Int. Cl.
*G06F 30/398* (2020.01)
*G01N 23/04* (2018.01)
*G01N 23/083* (2018.01)
*G01N 23/18* (2018.01)
*G01T 1/20* (2006.01)
*G06K 9/62* (2022.01)
*G06T 5/00* (2006.01)
*H01L 21/67* (2006.01)
*H05K 1/11* (2006.01)
*H05K 3/40* (2006.01)
*G06F 119/18* (2020.01)
*G06F 115/12* (2020.01)

(52) U.S. Cl.
CPC ............ *G01N 23/083* (2013.01); *G01N 23/18* (2013.01); *G01T 1/20* (2013.01); *G06F 30/398* (2020.01); *G06K 9/6256* (2013.01); *G06K 9/6267* (2013.01); *G06N 20/00* (2019.01); *G06T 5/007* (2013.01); *G06T 7/0012* (2013.01); *H01L 21/67288* (2013.01); *H05K 1/115* (2013.01); *H05K 3/4038* (2013.01); *G01N 2223/04* (2013.01); *G01N 2223/401* (2013.01); *G01N 2223/426* (2013.01); *G01N 2223/505* (2013.01); *G01N 2223/6466* (2013.01); *G06F 2115/12* (2020.01); *G06F 2119/18* (2020.01); *G06T 2207/10081* (2013.01); *G06T 2207/10116* (2013.01); *G06T 2207/20024* (2013.01); *G06T 2207/20081* (2013.01); *G06T 2207/20208* (2013.01); *G06T 2207/30004* (2013.01)

(56) References Cited

U.S. PATENT DOCUMENTS

| | | | |
|---|---|---|---|
| 9,996,890 B1* | 6/2018 | Cinnamon | G06T 7/62 |
| 2003/0118149 A1 | 6/2003 | Okuda | |
| 2013/0279655 A1 | 10/2013 | Ookawa | |
| 2017/0140524 A1* | 5/2017 | Karsenti | G06K 9/6287 |
| 2017/0200524 A1 | 7/2017 | Adler | |
| 2018/0243800 A1 | 8/2018 | Kumar | |
| 2018/0293721 A1 | 10/2018 | Gupta | |
| 2018/0342051 A1 | 11/2018 | Sezginer | |
| 2018/0374022 A1* | 12/2018 | Wang | H04N 5/33 |
| 2019/0212281 A1 | 7/2019 | Shchegrov | |
| 2019/0295908 A1* | 9/2019 | Rathert | G01R 31/2894 |

OTHER PUBLICATIONS

International Search Report and Written Opinion for International Application No. PCT/US2020/041527, dated Oct. 27, 2020.

* cited by examiner

6000

Access a first set of X-ray images of one or more first samples that are labeled as being non-conforming
610

Adjust a classification algorithm based on the first set of X-ray images, wherein the classification algorithm classifies samples into conforming or non-conforming categories based on an analysis of corresponding X-ray images
620

Analyze a second set of X-ray images of a plurality of second samples using the adjusted classification algorithm, wherein the second samples are previously inspected samples that have been classified as conforming by the classification algorithm during a previous analysis before the classification algorithm is adjusted
630

Identify one or more of the second samples from the second set of X-ray images, wherein each identified second sample is classified as non-conforming by the adjusted classification algorithm
640

*FIG. 6*

METHODS AND SYSTEMS FOR PRODUCT FAILURE PREDICTION BASED ON X-RAY IMAGE RE-EXAMINATION

PRIORITY

This application claims the benefit under 35 U.S.C. § 119(e) of U.S. Provisional Patent Application No. 62/873,752, filed 12 Jul. 2019, which is incorporated herein by reference.

TECHNICAL FIELD

This invention relates to product inspection based on X-ray images.

BACKGROUND

Integrated circuits may be manufactured to include 3D or 2.5D structures. The inspection techniques using optical photons or electrons to inspect silicon wafers cannot be used to inspect 3D and 2.5D IC packages because they do not penetrate through the ICs, interposers, or Cu—Cu die to die bonding sufficiently to provide an internal view of the packaged ICs. Optical inspection methods are also not capable of performing inspection or metrology for partially packaged components, a critical requirement for process control. Since X-rays can penetrate through many layers of packaging, X-ray inspections may provide an internal view of the assembled device.

Products including integrated circuits or components may be applied to field applications after passing the tests and inspections for quality control. However, after a period of time of usage in the field applications, some products may fail in one way or another. The failed products may trigger recalls involving massive number of products and could be very costly to the manufacturers.

SUMMARY OF PARTICULAR EMBODIMENTS

Particular embodiments described herein relate to systems and methods for adjusting X-ray inspection algorithms based on information learned from failure analysis of failed components and using the adjusted X-ray inspection algorithms to examine or re-examine X-ray images of inspected components to identify non-conforming components similar to the failed components. The system may first determine one or more failure modes of the failed components during a failure analysis process of the failed components. Then, the system may determine one or more indicative features that are correlated to the failure modes of the failed components. The indicative features may be determined based on original X-ray images of the failed components (before they fail), new X-ray images of the failed components (after they have failed), or information received from other inspection systems (e.g., an optical inspection system, an electrical test tool) or human experts. After that, the system may adjust the X-ray inspection algorithms (e.g., a rule-based classification algorithm, a machine-learning model, a computer vision algorithm, a statistical analysis algorithm) based on the new knowledge of the failed components. For example, the system may adjust one or more existing rules of the rule-based classification algorithm (which is used for classifying inspection components) or add one or more new rules to the rule-based classification algorithm. The adjusted rules or new rules may be determined based on the indicative features that are correlated to the failure modes of the failed components. As another example, the system may re-train a machine-learning model (which is used for classifying inspection components) using the X-ray images associated with the failed components. Then, the system may use the adjusted X-ray inspection algorithms to re-analyze the original X-ray images of a number of previously inspected components. These components may be classified as conforming components by the X-ray inspection algorithm before the adjustment based on the failed components. The X-ray inspection algorithm, once adjusted based on the failed components, may reject the components that are similar to the failed components (e.g., having the same or similar indicative features) as non-conforming components. The system may use the adjusted X-ray inspection algorithms to identify, from the previously inspected components, the subset of components that are similar to the failed components as non-conforming components. The system may use the adjusted X-ray inspection algorithms to inspect new components to reject the components that similar to the failed components as non-conforming components. The system may determine and send feedback/feedforward information to one or more manufacturing tools used for manufacturing new components to reduce the probability of producing non-conforming components. The system may determine and send feedback/feedforward information to one or more inspection tools used for inspecting new components to identify the components that are similar (e.g., having the same or similar indicative features) to the failed components.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter that can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates an example method for re-examining X-ray images of previously inspected samples to identify non-conforming samples for recall.

Figure 1A:
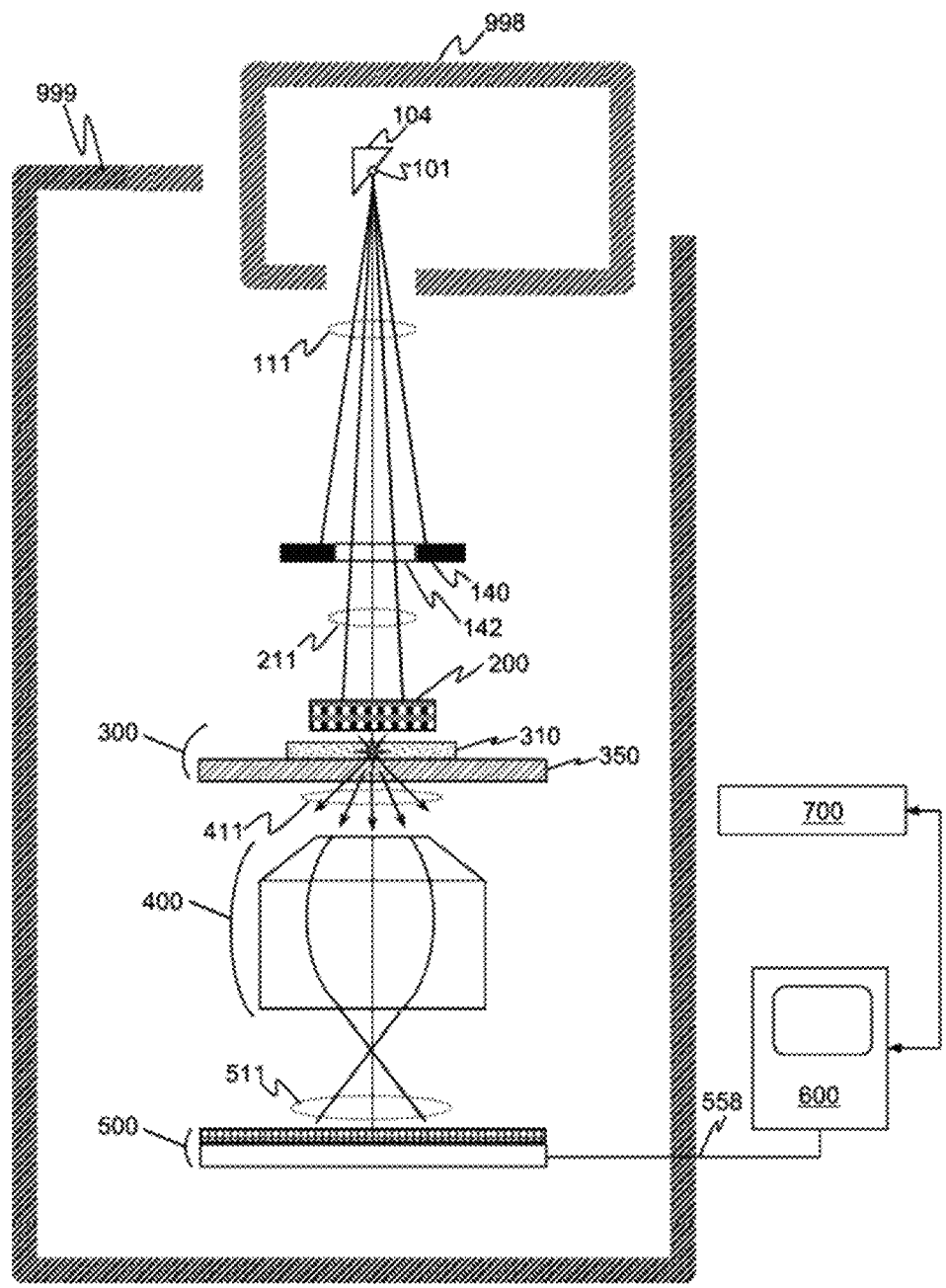
FIG. 1A illustrates an example automatic high-speed X-ray inspection system.

Note: Elements shown in the drawings are meant to illustrate the functioning of the invention and have not been drawn to scale.

DESCRIPTION OF EXAMPLE EMBODIMENTS

Automated High-Speed X-ray Inspection System
  X-ray System Framework

The system and methods disclosed herein are related to a system or the use of a system that illuminates an object to be examined or inspected with X-rays, converts X-rays to visible (or near-visible) photons, forms an image of the visible (or near-visible) photons, and then converts the image into an electronic form. As such, the various embodiments of this X-ray image formation system will be presented first, followed by the various embodiments of methods and systems that utilize the X-ray imaging system.

Although many kinds of objects can be examined or inspected using the apparatus disclosed here, it is expected to be especially suitable for the examination and inspection of integrated circuit wafers and packaging assemblies. One example of these are silicon interposers, comprising silicon with multiple TSVs, but the invention can also be used for the inspection of an integrated circuit (IC) itself, a silicon interposer, a silicon dioxide interposer, a printed circuit board (PCB) with or without ICs already installed, a 3D IC package or assembly, a 2.5D IC package or assembly, a multi-chip module (MCM), a system-in-package (SIP) and other electronic microdevices or portion thereof that comprise microscopic structures. These may be examined as incoming materials, completed products, or as partially manufactured objects at any stage of their manufacture for the purpose of metrology, process control, inspection, or yield management.

Non-electronic devices with micro- or nano-structures, such as magnetic recording media, photonic structures and photonic crystals, metamaterials, etc., can also be examined and inspected using this invention. Capacitive sensors, such as fingerprint sensors, can also be examined. A particularly attractive feature of the apparatus is that it is possible to make non-destructive, high-resolution observations and measurements of features within an object that cannot otherwise be seen using electrons or optical photons, as are used in conventional metrology and inspection tools.

In general, objects suitable for use with this invention will comprise at least one flat side. Examples include: electronic circuits on semiconductor wafers, parts of wafers or selected areas on wafers; integrated circuit chips, dice, assemblies, packages, or portions thereof; micro-fluidic devices; micro-electro-mechanical systems (MEMS), including accelerometers, gyros, magnetic and capacitive sensors and the like; photonic devices, particularly those fabricated using planar waveguides; biological tissues, including stained samples; photomasks or templates for printing or fabricating any of the above mentioned devices; and solar cells, parts thereof or parts pertaining to solar cells. Other objects without flat sides may be observed and inspected as well, but the image quality may not be uniform for objects of irregular dimensions.

In particular embodiments, the X-ray inspection system as described in this disclosure may be a high-speed X-ray inspection system. In particular embodiments, the high-speed X-ray inspection system may have a higher measurement/inspection speed than traditional X-ray systems (e.g., 100 times faster than traditional X-ray systems). As an example and not by way of limitation, the high-speed X-ray inspection system may be capable of inspecting electronic components or devices with an image collection time of approximately 33 milliseconds. In particular embodiments, the X-ray inspection system as described in this disclosure may be an automated X-ray inspection system. In particular embodiments, the automated X-ray inspection system may include one or more computers or controllers and instructions stored in one or more computer media. The automated measurement process of the automated X-ray inspection system may be controlled by the computers or controllers by executing corresponding instructions. The automated measurement process of the automated X-ray inspection system may not need interventions from human operators and may be automatically performed following particular procedures.

In particular embodiments, the X-ray inspection system as described in this disclosure may use one more artificial intelligence (AI) modules and/or machine-learning models. In particular embodiments, the artificial intelligence (AI) modules may be or include any suitable methods, processes, and/or algorithm performed by one or more computing systems. In particular embodiments, the machine-learning models may be or include, for example, but are not limited to, a rule-based algorithm, a random forest model, a neutral network or any suitable machine-learning models. In particular embodiments, the X-ray inspection system as described in this disclosure may perform real-time measurements to one or more processes performed by another system (e.g., a drilling machine, a bonding tool, an assembling tool, or any suitable tools). In particular embodiments, the term "real-time measurements" may refer to measurements performed by the X-ray inspection system in parallel to an associated process (e.g., a drilling process, an assembling process, a bonding process, or any suitable processes) without slowing down the associated process. The X-ray inspection system may perform measurements and provide feedback to the systems performing the associated process in a speed higher than or equal to the speed of the associated process.

In particular embodiments, the X-ray inspection system as described in this disclosure may perform in situ and/or inline measurements with one or more other systems or tools (e.g., a drilling machine, a bonding tool, an assembling tool, or any suitable tools). In particular embodiments, the term "in situ measurements" may refer to measurements performed by the X-ray inspection system which is integrated with other systems. For example, the X-ray inspection system may be integrated into a drilling machine and perform in situ measurements to monitor the drilling process of the drilling machine. The in situ measurements may be automatically controlled by one or more computing systems coordinating the X-ray inspection system and the drilling machine. In particular embodiments, the term "inline measurements" may refer to measurements performed by the X-ray inspection system within the same process (e.g., a drilling process, an assembling process, a bonding process, or any suitable processes) performed by another system (e.g., a drilling machine, a bonding tool, an assembling tool, or any suitable tools). For example, during an assembling process performed by an assembling tool, the X-ray system may inspect the assembled components or devices during one or more steps of the assembling process. The components or devices may be automatically transferred from the assembling tool to the X-ray inspection system (e.g., by a robot arm) or may be manually transferred from the assembling tool to the X-ray inspection system (e.g., by a human operator). The X-ray inspection system may provide feedback information automatically to the assembling tool or to a human operator.

X-ray Imaging System

FIG. 1A illustrates an example automatic high-speed X-ray inspection system 1000A. An X-ray emitter 101 emits X-rays 111. These X-rays are then shaped into a collimated X-ray beam 211, in some embodiments using distance from the emitter 101 and a plate 140 with an aperture 142. This collimated X-ray beam 211 then illuminates an object 200 to be examined. The X-rays that are transmitted through the object 200 illuminate a scintillator assembly 300 comprising a scintillator 310 and, in some embodiments, a support 350 for the scintillator. The scintillator 310 absorbs a portion of the X-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted to a system of electronics 600 that, in some embodiments can display the image results, and in some embodiments can store the image results and/or perform image processing algorithms on the image results in conjunction with a computer system 700.

For any source emitting ionizing radiation such as X-rays, it is often wise to provide shielding 998 around the X-ray source 100, and in some situations legally required for operation. Such shielding 998 can be a simple enclosure of shaped sheets of lead metal, or a more intricate design fabricated from any of a number of X-ray absorbing materials, such as lead-doped glass or plastic, that will be known to those skilled in the art. Shielding is desirable to keep random X-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of X-ray absorbing materials such as lead-doped glass or plastic, that will be known to those skilled in the art. Additional shielding 999 is desirable to keep random X-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to X-ray exposure, in some embodiments a portion of the scintillator assembly 300 can also be fabricated in whole or in part using a material, such as a lead-doped glass, which absorbs X-rays while transmitting the visible photons 411 emitted by the scintillator.

Figure 1B:
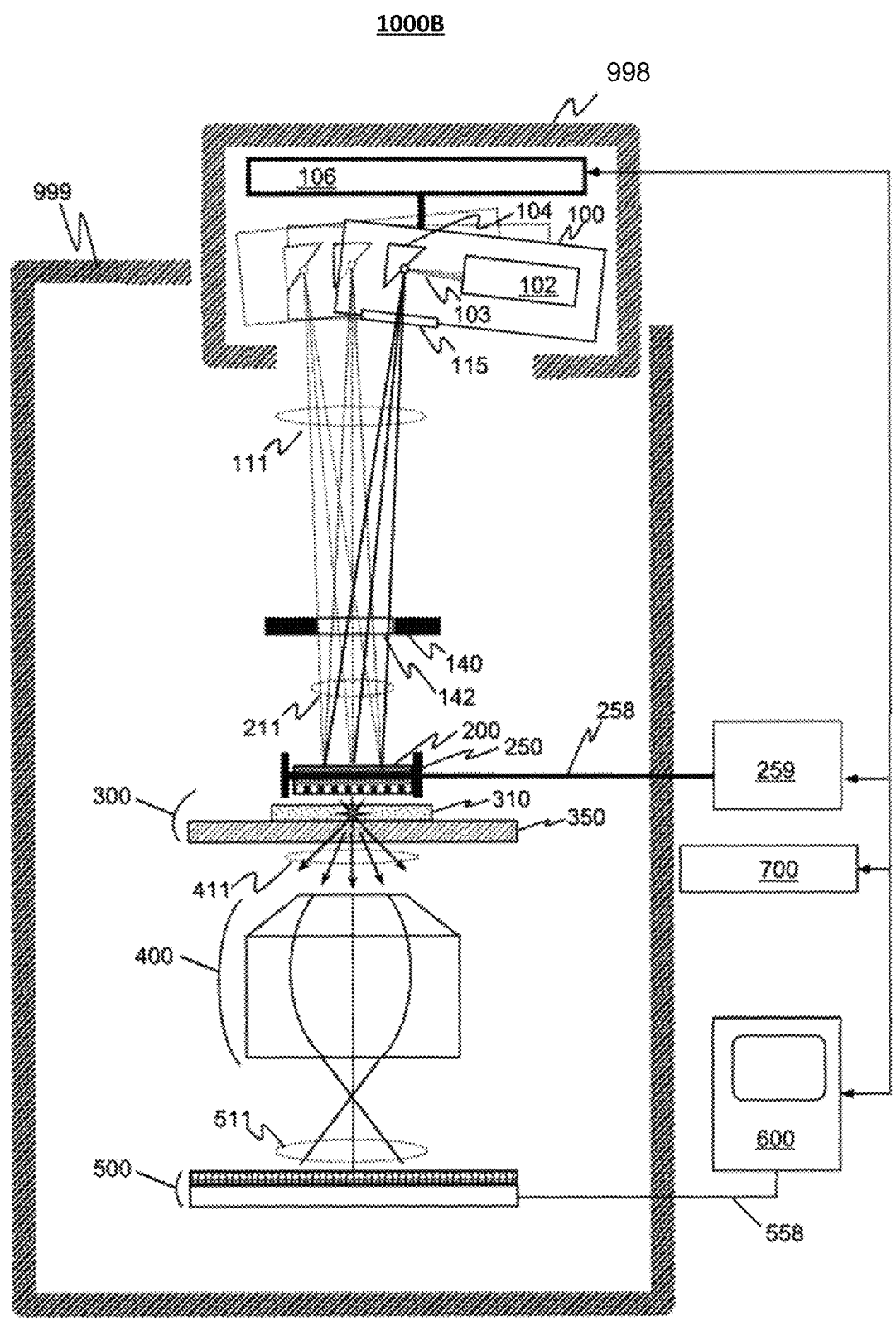
FIG. 1B illustrates an example X-ray inspection system with movable X-ray source with respect to the inspected object for generating X-ray images at different directions.

FIG. 1B illustrates an example X-ray inspection system 1000B with movable X-ray source with respect to the inspected object for generating X-ray images at different directions. As an example and not by way of limitation, the X-ray system may include a mount 106 that can move the position of the X-ray source 100 relative to the object 200, thereby changing the angle of incidence of the X-ray beam on the object. The mount 106 can be designed to allow the X-ray source 100 to swing in the x-z plane, in the y-z plane, or any other combination of axes. The source can also be moved along the z-axis to move the X-ray source 100 closer to the object 200. This may have the effect of making the beam brighter, increasing signal strength, at the cost of having an X-ray beam that is less collimated, reducing resolution. This effect may be reduced or eliminated by reducing the spot size of the X-ray source.

Motion of the X-ray source 100 using the mount 106 can be controlled by the computer system 700 several ways. In some embodiments, the source mount 106 may move the X-ray source 100 to a fixed location to allow an image to be captured. In some embodiments, the mount 106 can move the X-ray source 100 continuously as images are gathered, allowing the dynamic change of X-ray intensity as transmitted through the object 200 to be recorded as a function of illumination angle. In some embodiments, the X-ray emitter 101 can be moved to at least 10 degrees off the normal incidence angle. In some embodiments, further adjustment of the angle of incidence of the X-ray beam 211 on the object 200 can be achieved by coordinating the motion of the X-ray source 100 using the source mount 106 with the motion of the object 200 using the object mount 250. This coordination can be done manually or using the computer system 700. In some embodiments, the shielding 998 will be designed to enclose the X-ray source 100 and the source mount 106. In other embodiments, the shielding 998 can be designed to only enclose the X-ray source, with the mount 106 designed to move the shielding 998 as it moves the X-ray source 100. In some embodiments of the invention, multiple X-ray sources may be used to produce images with different angles of incidence. The X-ray sources may be fixed in space or moveable and may be operated sequentially or simultaneously. They can be operated manually or controlled by one or more computer systems 700.

In particular embodiments, the X-ray imaging system described in this disclosure may be an automated high-speed and high-resolution X-ray imaging system for generating X-ray images of electronic devices. In particular embodiments, the automated high-speed X-ray inspection system may include X-ray detectors with a high sensitivity for X-ray radiation, a very large number of grayscale levels (e.g., 10,000+ grayscale levels) with a large dynamic range, and a large number of pixels (e.g., greater than 29 megapixels) for generating high resolution images. In particular embodiments, the system may have a spatial resolution of lower than 2 μm, a field of view of 12 mm×12 mm, and a throughput greater than 3000 mm$^2$ per minute. More details about the X-ray system may be found in U.S. patent application Ser. No. 15/470,726, filed 27 Mar. 2017, which is incorporated herein by reference.

Overview

Problems Being Solved

Complex electronic components or devices may be integrated into a large number of (e.g., millions) end products, such as, automobiles, smart phones, tablets, computers, communication devices, etc. Even though these components pass the electrical test and are identified as conforming components during the quality control inspection after being manufactured, some of the components may fail in one way or another after a period of time of usage in field applications. These failures may trigger massive recalls (e.g., automobiles recall because of potential problems of electronic components) because the components that have failed or have a high probability of failure could raise serious safety concerns of the customers. Product recalls that are based on product models, product batch numbers, or manufacturing years could involve massive number of products, and therefore could be very costly to the manufacturers.

Solution Summary

In particular embodiments, the automated high-speed X-ray inspection system may inspect electronic components during or after a manufacturing process of these components and before these components are applied to field applications. The system may capture X-ray images of the inspected components and store these X-ray images in a database for a long time period (e.g., 20 years for automobile products). When one or more components fail after a period of time of usage in field applications, the system may determine (e.g., during a failure analysis process) one or more indicative features associated with one or more failure modes of the failed components. Then, the system may re-examine the X-ray images of the previously inspected components that are stored in the database to identify the components that have one or more of the indicative features or are similar to the failed components. The system may predict the probability of failure for each re-examined component based on these re-examination results. The system may identify a subset of components that are predicted to have a high probability of failure and generate recall recommendation based on the identified subset of components.

Benefits and Advantages

By re-examining the X-ray images stored in the database and identifying the subset of components that have the same or similar indicative features with the failed components, particular embodiments of the system may allow manufacturers to precisely identify products that need to be included in a recall, and therefore dramatically reduce the number of products and the cost of the recall. By re-examining the X-ray images in the database, the system may precisely identify the problematic components and predict their probability of failure, and therefore greatly improve the safety for end users of the products. Furthermore, by sending feedback or feedforward information determined based on the re-examination results, particular embodiments of the system may allow one or more steps of the manufacturing process or downstream or upstream steps of the manufacturing process to be optimized based on the knowledge learned from the failed components to reduce the probability of failure for future components.

Initial X-ray Inspection of Components Before Field Applications

Initial X-Ray Inspection Process

In particular embodiments, the automated high-speed X-ray inspection system may inspect electronic components (or electronic parts, modules, packages, etc.) after these components are manufactured or during the manufacturing process and before these components are applied to field applications (e.g., integrated into an automobile or an electronic device). During the initial X-ray inspection process, the X-ray inspection system may capture X-ray images of the manufactured components and store the captured X-ray images in a database. The system may identify defective components or low quality components based on a limited number of X-ray images (e.g., top-down X-ray images or X-ray images captured from several angles). For example, the system may determine material thickness of elements of interest (e.g., solder balls, solder contacts, solder connections, pins, joints, etc.) within an electronic package based on one or more X-ray images of the electronic package. The system may determine the material thickness based on variation of the X-ray absorption as represented by variation of image grayscale values. The system may use computer vision and computational analysis technologies to determine the material thickness distribution (e.g., profile or shape of associated elements of interest) and other features (e.g., edges, shapes, gradients, trends, grayscale values, etc.) of the inspected samples based on these X-ray image(s) to identify defective samples.

Inspection Speed and Resolution

In particular embodiments, the X-ray system may include one or more high-resolution X-ray detectors for generating high-resolution X-ray images during the X-ray inspection process. For example, the X-ray detectors may have a large number of pixels (e.g., 12+ megapixels, 29+ megapixels), a high sensitivity for X-ray radiation, and a large number of grayscale levels (e.g., 10,000+ grayscale levels) with a large dynamic range. In particular embodiments, the system may generate X-ray images with a frame rate of at least 30 FPS. An X-ray image may be generated in a time period that is equal to or less than 33 milli seconds. In particular embodiments, the system may measure small scale features with a spatial resolution of smaller than 0.5 microns. In particular embodiments, the X-ray images may be captured with a large field of view of at least 12 mm×12 mm. In particular embodiments, the samples may be inspected with a speed of no less than 3000 mm$^2$ per minute.

In-line, In-situ, and Real-time Inspection

In particular embodiments, the system may use computer vision algorithms or/and machine-learning models to automatically analyze the captured X-ray images, identify defective samples, and classify defective samples into different categories. The computer vision algorithms and machine-learning models may analyze the X-ray images and provide metrology information in real-time at a speed that matches the speed for capturing X-ray images. As a result, the system may perform X-ray inspection many times faster (e.g., 100+ times faster) than traditional X-ray systems. In particular embodiments, the high-speed X-ray inspection capability may allow the system to be used for inline inspection of electronic parts during their manufacturing process. The system may capture X-ray images for the inspected samples, identify defective samples, evaluate quality levels of the conforming samples, and provide feedback or/and feedforward information to other tools used in the manufacturing process. In particular embodiments, the X-ray inspection may be performed in real-time during the manufacturing process of the inspected samples. In particular embodiments, the X-ray system may be integrated to the manufacturing tool (e.g., an assembling tool, a bonding tool, a placement tool, a thermo-compression bonding tool, a drilling machine) to perform in-situ X-ray inspection. In this disclosure, the term "conforming samples" or "conforming components" may refer to the samples or components that are conforming or compliant to requirements of product specifications and are identified as qualified samples or components for shipping to customers and applying to field applications. The term "non-conforming samples" or "non-conforming components" may refer to the samples or components that are not conforming or compliant to requirements of product specifications and are identified to be not qualified for shipping to customers and applying to field applications.

In particular embodiments, the X-ray inspection system may perform inline X-ray inspection on a subset or all of the samples during the manufacturing process of these samples. The term "inline inspection" or "inline measurement" may refer to inspection or measurement performed by the X-ray system within the same process (e.g., a drilling process, an assembling process, a bonding process, a manufacturing process, or any suitable processes) performed by another system (e.g., a drilling machine, a bonding tool, an assembling tool, or any suitable tools). As an example and not by way of limitation, during an assembling process performed by an assembling tool, the X-ray system may inspect the assembled parts, components or devices during one or more steps of the assembling process. The parts, components or devices may be automatically transferred from the assembling tool to the X-ray inspection system (e.g., by a robot arm, a conveyor belt) or may be manually transferred from the assembling tool to the X-ray inspection system (e.g., by a human operator). The X-ray inspection system may provide feedback information automatically to the assembling tool or to a human operator of the assembling tool. The system may inspect the component assemblies after they are assembled and before being put into the heating chamber. The system may inspect these component assemblies again after being bonded by a heating chamber. The system may identify the alignment changes before and after the bonding process. The system may measure the alignments and positions of a number of elements of interest within the inspected samples and send the measurement results to the assembling tool, the bonding tool, or their operators. In particular embodiments, the system may alert the operator for any potential issues that may affect the quality of manufactured products. The operators may adjust one or more parameters (e.g., temperature of heat chamber, intermediate time duration, position parameters, alignment parameters, etc.) to improve the manufacturing process for manufacturing products with a higher quality. In particular embodiments, the system may automatically send feedback information (e.g., instructions or data) to the assembling tool to cause the assembling tool to automatically adjust one or more functions or parameters to improve the manufacturing process with higher quality. In particular embodiments, the assembling tool may be a bonding tool, for example, a mass reflow device associated with a placement tool, a thermo-compression bonding tool, etc.

In particular embodiments, the X-ray inspection system may perform real-time inspection or real-time measurement of electronic parts, components, or devices in one or more steps of their manufacturing process (e.g., a drilling process, an assembling process, a bonding process, etc.). The term "real-time inspection" or "real-time measurement" may refer to inspection or measurement performed by the X-ray system in parallel to an associated process (e.g., a drilling process, an assembling process, a bonding process, or any suitable processes) without slowing down the associated process. For example, during an assembling process, the system may perform inspections or measurements at a speed that is higher than or equal to an assembling tool assembling the electronic parts, components, or devices. The system may capture X-ray images of the assembled parts, analyze the X-ray images using computer vision algorithms or/and machine-learning models, generate metrology information related to the inspected parts, and provide feedback information to the assembling tool in real-time during the assembling process.

In particular embodiments, the automated high-speed X-ray inspection system may perform in situ inspection or measurement to one or more other systems or tools (e.g., a drilling machine, a bonding tool, an assembling tool, a placement tool, a mass reflow device, or any suitable tools) used in one or more steps of the manufacturing process. The term "in situ inspection" or "in situ measurement" may refer to inspection or measurement performed by the X-ray system that is local to other systems for performing other steps of the manufacturing process. In particular embodiments, the X-ray system may be integrated with other systems or tools (e.g., a drilling machine, a bonding tool, an assembling tool, a placement tool, a mass reflow device, or any suitable tools or equipment) used in the manufacturing process. As an example and not by way of limitation, the X-ray system may be integrated into a drilling machine and perform in situ inspections or measurements to monitor the drilling process of the drilling machine. The in situ measurements may be automatically controlled by one or more computing systems coordinating the integrated X-ray inspection system and the drilling machine.

As another example, the X-ray system may be integrated into a bonding tool and perform in situ inspection or measurement to monitor the bonding process performed by the bonding tool. The in situ measurements may be automatically controlled by one or more computing systems coordinating the integrated X-ray system and the bonding tool. The system may continuously perform in situ inspection or measurement to the bonding tool and continuously feed the inspection or measurement results to the bonding tool to cause the bonding tool to adjust one or more functions or process parameters (e.g., temperatures, intermediate time duration, or any suitable process parameters). Once adjusted, the bonding tool may have a lower probability for producing defective parts or parts with deviating parameters from specification requirements. The manufactured products may have a higher quality and a lower defect rate and a lower failure rate in field applications. In particular embodiments, the system may be integrated to bonding tools of any suitable types, for example, bonding tools for bonding assemblies with a heat chamber, bonding tools for bonding assemblies with pressure, bonding tools for metal-to-metal bonding, etc. In particular embodiments, the X-ray inspection system may identify a non-uniform temperature distribution in the heat chamber of the bonding tool and may feed that information to the heat chamber to adjust its operating parameters to have a uniform temperature distribution.

As another example, the system may be integrated to an assembling tool for assembling electronic parts. The assembling tool may include a placement tool and a mass reflow device. The system may continuously or periodically perform in situ inspection or measurement over time on the electronics parts (e.g., measuring mis-alignment or mis-placement) processed by the assembling tool. The system may track mis-alignment over time and identify an increasing trend in the measured mis-alignment. The system may send instructions to the assembling tool for adjusting related parameters based on the identified trends. The system may identify one or more drifting parameters (e.g., a drifting alignment, a drifting location, a drifting quality metric)

before the assembling tool producing defective parts. The system may feed the measurement results or/and adjustment instructions to the assembling tool to cause the assembling tool to adjust one or more functions or process parameters (e.g., alignments, positions, placements, or any suitable parameters) to improve the assembling process. Once adjusted, the assembling tool may have a lower probability for producing defective or non-reliable parts. The electronic parts assembled by the assembling tool with the adjusted process parameters may have a higher quality, a lower defect rate, and a lower failure rate in field applications.

Inspected Parameters and Defect Types

In particular embodiments, the X-ray inspection system may be used inline or/and in situ in electronics manufacturing processes for inspecting the manufactured electronic parts or devices. The system may capture X-ray images of the inspected samples and generate metrology information related to these samples based on the captured X-ray images. In particular embodiments, the metrology information generated by the system may include, for example, but are not limited to, information about shapes of solder balls or solder contacts, information about one or more dimensions of a solder ball or a solder contact, information about one or more solder contact defects, information about alignment of an integrated circuit die to an interposer, information about a warpage defect, a uniformity metric of solder contacts, a solder contact external size, a joint diameter, a darkness metric of a contact pad area, a uniformity metric for a darkness coverage of a contact pad area, a continuous signal variation over a location of a contact pad, a bright signal ring where a ball and solder meet, a small dark and a uniform coverage over the contact pad area, deviations from parameters normally defining conforming solder joints, etc.

In particular embodiments, the automatic high-seed X-ray inspection system may be used to inspect electronic parts, components, devices, packages, or any suitable samples of interest. In particular embodiments, the X-ray inspection system may inspect a variety of samples of interest including, for example, but not limited to a high-density chip package, a 2.5D high-density chip package, a 3D high-density chip package, a package on package (PoP), a radio frequency (RF) package, a system-in-package (SIP) device, a fan-out wafer level package, etc. In particular embodiments, the X-ray inspection system may inspect samples of interest to detect solder contact defects including, for example, but not limited to a head-in-pillow defect, a snowman defect, a missing solder defect, a low solder volume defect, a high solder volume defect, a solder bridging defect, a partially-wet defect, a misalignment defect, a micro-bump defect, a cracked solder ball, a solder ball void, or a defective solder contact diameter. In particular embodiments, the solder defect may be identified based on a number of parameters measured by the X-ray inspection system including, for example, but not limited to a uniformity metric of the solder contact external size, a joint diameter, a darkness metric of a contact pad area, a uniformity metric for a darkness coverage of the contact pad area, a continuous signal variation over a location of a contact pad, a bright signal ring where a ball and solder meet, a small dark and uniform coverage over the contact pad area, deviations from parameters normally defining a good joint, etc. In particular embodiments, the automated high-speed X-ray inspection system may further detect one or more of a misaligned optical fiber, a misaligned optical connector, a warpage defect, a defective gap, a defective bond-line length, or a die warpage defect in a ball grid array (BGA).

In particular embodiments, the system may identify one or more defects associated with inspected samples based on the captured X-ray images. These defects may not be able to be detected by visible light-based inspections. For example, the system may inspect solder joints in flip chip or ball grid array packaging and these features may be obstructed by other components (e.g., components of other layers) and cannot be inspected by visible light-based inspection. In particular embodiments, the system may be capable of identifying a wide range of problems associated with the inspected electronic parts, components, packages, or devices including, for example, but not limited to, die chipping or cracking, standing or tombstoning components, component misalignments, component misalignments, missing components, solder wetting status (e.g., over-wet, non-wet), solder bridging (e.g., short), solder voids, oversized solder joints, undersized solder joints, missing balls, extra solder material, mis-located solder balls, surface-mounted component cracking, extra components, double components, rotated components, die tilting, non-wet copper connections, non-wet solders for surface-mounted components, insufficient solder for surface-mounted components, shorted surface-mounted connections, PCB via voids, embedded components, stack dies, die attachment coverages, etc.

In particular embodiments, the X-ray inspection system may examine the configuration of one or more elaborate structures such as multiple ICs or ICs and interposers stacked in a 2.5D or a 3D configuration, prior to completing the bonding of the configuration, to insure the components have been correctly aligned. In particular embodiments, the X-ray inspection system may as a sub-system of a bonding system to not only examine and inspect, but to align and bond these multi-chip structures. For example, the X-ray inspection system may be used to align to objects before bonding or otherwise connecting them. In particular embodiments, the X-ray inspection system may be used in an alignment process between a chip and an interposer prior to bonding or attaching the individual components. The process of alignment and bonding may be adjusted to improve the accuracy and quality of these connections based on X-ray images generated by the X-ray inspection system. In particular embodiments, the X-ray inspection system may be used for real time feedback to alignment tools in aligning dice or interposers. In particular embodiments, the X-ray inspection system may be used to inspect the shape and dimensions of solder used to connect devices or interposers. These inspections may be used to control the manufacturing process or screen out defective material. The presence of some patterns of solder after bonding may be used to detect improper solder joints including joints in which the solder is not continuous between the two connection points and is therefore not a useful conductor of electricity or heat. In particular embodiments, multiple solder reflow processes may be utilized to repair or improve solder connections that are determined to be non-complying with manufacturing or product specifications based on inspection results of the X-ray inspection system.

Classify Defects Based on Feature Space

In particular embodiments, the system may use rule-based algorithms (e.g., using reference models) or/and machine-learning models to identify defects in the inspected samples and classify the inspected samples into different categories. In particular embodiments, for an object of interest, the system may select one or more reference objects (e.g., preceding parts or surrounding parts of the same manufacturing line, the same inspection line, or the same production batch) and generate a reference model based on X-ray images of these reference objects. These reference objects may be the same type of objects to the object of interest and may have the same components with the object of interest. The system may compare the X-ray image of the object of interest to the reference model. The system may flag the difference between the X-ray image of the object of interest and the reference model. The system may use one or more defect models to determine whether the object of interest is associated with one or more defects, and if it is, classify these defects into respective defect categories. The defect models may be associated with a number of features (e.g., characterized by corresponding parameters with associated thresholds) for characterizing respective defect types. Since the X-ray images of the reference objects may have the same or similar background noise pattern to the X-ray image of the object of interest, the system may eliminate or minimize the influence of the background noise on identifying and classifying defects by comparing the X-ray image of the object of interest to the reference model. The system may identify and classify defects in the object of interest based on a single X-ray image captured from a particular angle or a limited number of X-ray images captured from different angles.

In particular embodiments, the system may use one or more machine-learning models to analyze the X-ray images and classify the inspected samples. The machine-learning models may be trained by historical data (e.g., features associated with labeled samples for supervised training, features associated with un-labeled samples for un-supervised training). The machine-learning models, once trained, may be used to inspect and classify new samples based on features extracted from X-ray images. The system may first extract a first set of features from X-ray images of the inspected samples. Then, the system may use a first machine-learning model, which is trained by un-labeled samples, to classify the inspected samples into inliers (i.e., conforming samples) and outliers (i.e., non-conforming samples) based on the first set of features. The inlier samples may be the samples that are statistically similar to the conforming samples. The outlier samples may be the samples that are statistically different from the conforming samples. In particular embodiments, the system may use the first machine-learning model to classify the inspected samples into inlier and outlier samples based on a comparison between a first set of features extracted from the X-ray images of the inspected samples and corresponding features of conforming samples. In particular embodiments, the system may classify the outlier samples into false positives or different defective types using a second machine-learning model. The second machine-learning model may be trained by labeled samples of different defect types to classify the outlier samples into a number of sub-categories (e.g., false positives, void defects, non-wet defects, non-contact open defects, head-in-pillow defects, bridging defects, misalignments, etc.) based on a second set of features determined based X-ray images of the inspected samples. The classification of false positives and different defective types may be based on a comparison of a second set of features extracted from the X-ray images of the inspected samples and the respective features of the positive false model and different defect models. In particular embodiments, the system may use one or more statistical analysis algorithms (instead of or in addition to the machine-learning models) to classify the inspected samples to inlier and outlier samples and classify the outlier samples into false positive samples and samples of different defect types. In particular embodiments, the second set of features may be different features from the first set of features. In particular embodiments, the second set of features may share some features with the first second of features.

In particular embodiments, by using two machine-learning models for inlier/outlier classification and sub-category classification, the system may allow each of the two models to be re-trained and updated without negatively affecting the accuracy and precision of the other model. For example, the system may periodically receive labeled samples of different defect types from a second X-ray tool (e.g., a CT x-ray system) and use the newly received labeled samples to re-train the second machine-learning model for classifying different defect types without affecting the first machine-learning model for classifying inlier/outlier samples. As another example, the first machine-learning model for classifying inlier/outlier samples may be re-trained by new samples (e.g., unlabeled samples) without affecting the second machine-learning model. In particular embodiments, the system may use a computer vision algorithm to extract the features of the inspected samples from X-ray images and feed the extracted features into the machine-learning models, which are trained based on features of corresponding training samples. In particular embodiments, the system may use a separate machine-learning for extract the features of the inspected samples from X-ray images and feed the extracted features to another machine-learning model for identifying and classifying samples. In particular embodiments, the system may directly feed the X-ray images of the inspected sample to the same machine-learning models which may extract the features of the inspected samples from the X-ray image, identify, and classify defects associated with the inspected samples.

In particular embodiments, the features of the first set of features or/and the second set of features extracted by the system may include, for example, but are not limited to, one or more component dimensions (e.g., diameter, length, width, height, thickness), component areas, material distributions, profile gradients, positions, distances to other components, relative positions or stacking orders to other components, one or more variations cross multiple X-images generated at different directions (e.g., diameter variations, length variations, width variations, height variations, area variations, shape variations, position variations, displacements, alignment variations), one or more characteristics (e.g., relative amplitude differences, changing trends), rates of change of grayscales in X-ray images, curvatures of curved lines, gradients of one or more edges, one or more characteristics of surrounding areas, etc. In particular embodiments, the first set of features and the second set of features may each include a combination of one or more features as described above. In particular embodiments, the second set of features may be different or partially different from the first set of features. In particular embodiments, the second set of features may be the same as the first set of features.

Figure 2A:
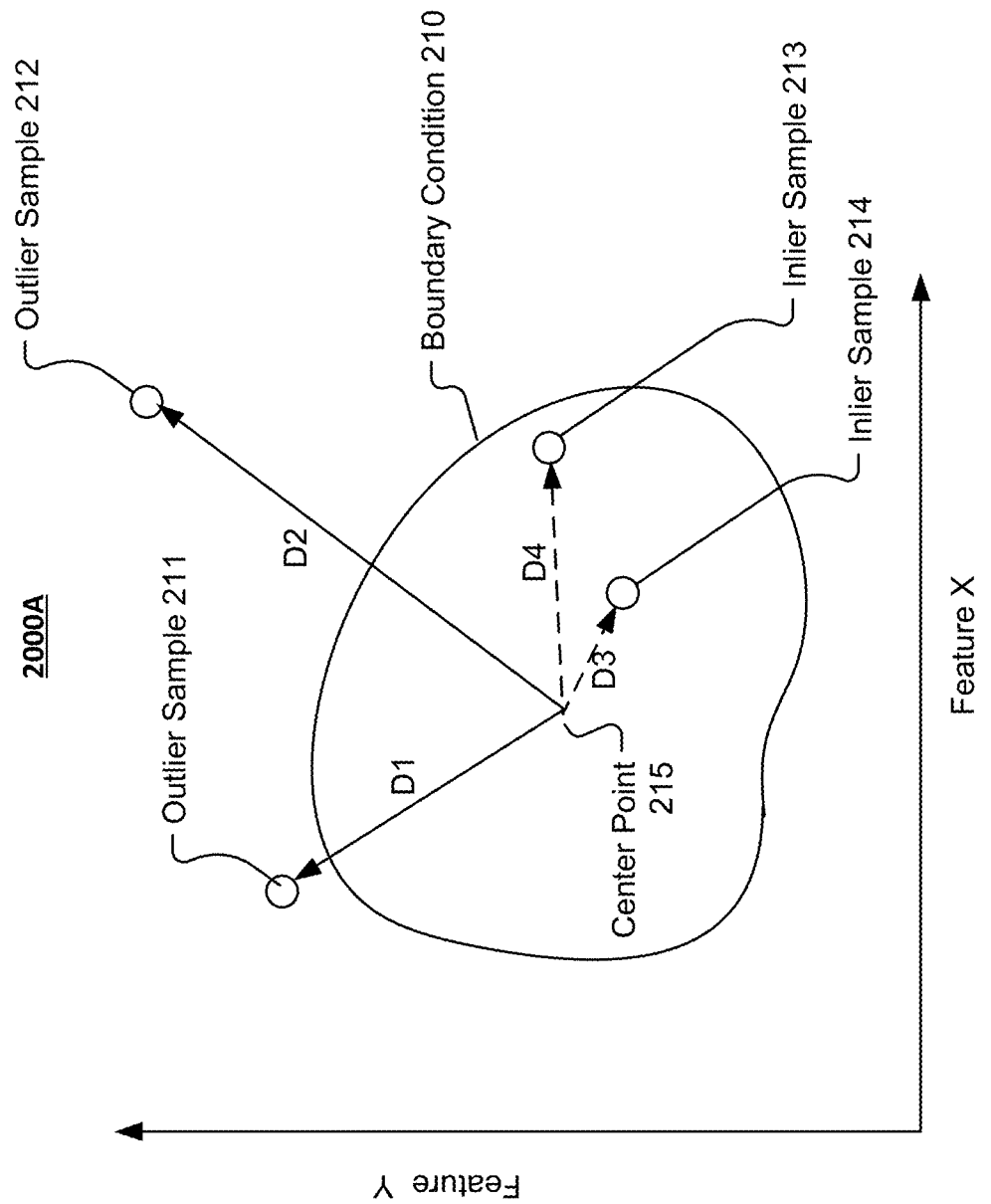
FIG. 2A illustrates an example scheme for classifying inspected samples into inlier samples and outlier samples based on a first set of features.

FIG. 2A illustrates an example scheme 2000A for classifying inspected samples into inlier samples and outlier samples based on a first set of features. In particular embodiments, the system may determine an N-dimensional feature space based on the first set of N features. The system may determine the boundary condition 210 of inlier samples in the N-dimensional feature space based on one or more criteria that characterize the inlier samples. For example, the inlier samples may be characterized based on corresponding locations in the feature space and corresponding distances to a reference point (e.g., the center point 215) or/and the boundary condition 210. For inspecting new samples, the system may extract the corresponding features from the X-ray images of the inspected samples, compare those extracted features to corresponding features of the inlier samples, and classify the inspected samples into inlier samples and outlier samples. As an example and not by way of limitation, the boundary condition 210 may be characterized in the feature space by two features (e.g., feature X and feature Y). The system may determine the locations of the inspected samples in the feature space and the distances of the inspected samples to the boundary condition 210 and classify the inspected samples. For example, the system may determine the inspected samples 219 and 212 are outlier samples because they are outside the boundary condition 210 in this feature space. As another example, the system may determine that the inspected sample 213 and 214 are inlier samples because they are within the boundary condition 210. It is notable that the two dimensional feature space as shown in FIG. 2A is for example purposes only, and the feature space is not limited thereto. For example, the feature space may be a N-dimension space defined on N features of the first set of features. It is notable that the boundary condition as shown in FIG. 2A is for example purpose only, and the boundary condition is not limited thereto. For example, a boundary criterion may be based on a single feature or a combination of any number of features of the inspected samples.

Figure 2B:
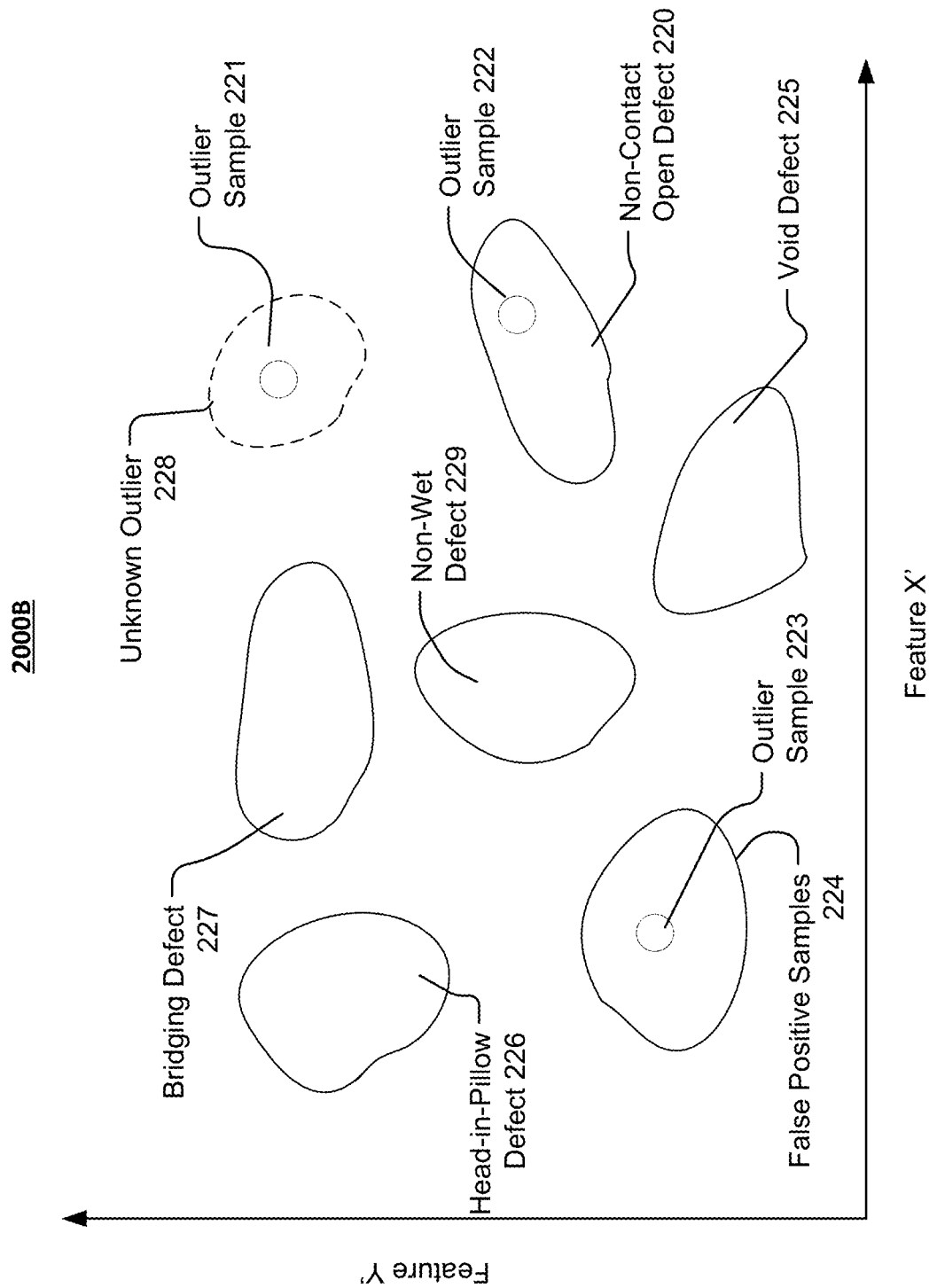
FIG. 2B illustrates an example scheme for classifying inspected samples into different sub-categories based on a second set of features.

FIG. 2B illustrates an example scheme 2000B for classifying inspected samples into different sub-categories based on a second set of features. In particular embodiments, the system may generate a number of outlier sample models in a feature space based on a second set of features including M features. The outlier sample models may be characterized in the feature space (e.g., a M-dimension space based on M features of the second set of features) using one or more criteria that characterize the similarity of the outlier samples. In particular embodiments, the second set of features may be a different set of features from the first set of features. During the inspection process, the system may extract the corresponding features from the X-ray images of the inspected samples, compare those extracted features to the outlier sample models in the feature space, and classify the outlier samples into different sub-categories. As an example and not by way of limitation, as shown in FIG. 2B, the system may generate a number of outlier sample models in the feature space. The outlier models may include, for example, but are not limited to, a false positive model 224, a void defect model 225, a non-contact open defect model 220, a non-wet defect model 229, a head-in-pillow defect model 226, a bridging defect model 227, a model for unknow outlier samples 228, etc. The system may determine the corresponding locations of the outlier samples in the feature space and classify the outlier samples into different categories. For example, the outlier sample 221 may be classified as an unknown outlier since it is an outlier sample but does not fall into any sub-categories in the feature space of the second set of features. As another example, the outlier sample 222 may be classified as non-contact open defect 220 since it falls in the boundary of the non-contact open defect 220. As yet another example, the outlier sample 223 may be classified into the false positive category because it falls in the boundary of the false positive category 224. It is notable that the outlier sample models as shown in FIG. 2B are for example purposes only, and the models are not limited thereto. For example, the models may be based on a feature space described by any number of features of the second set of features.

Classification Algorithms

In particular embodiments, the inspected samples may be classified using one or more classification algorithms including, for example, but not limited to, a rule-based classification algorithm, a computer vision algorithm, a machine-learning model, a statistical analysis algorithm, etc. In particular embodiments, the classification algorithms (e.g., a rule-based classification algorithm or a machine-learning model) may be fed with the X-ray images of the inspected samples for classifying these samples into different categories. In particular embodiments, the classification algorithms (e.g., a rule-based classification algorithm or a machine-learning model) may be fed with the features extracted from X-ray images of the inspected samples to classify these samples into different categories based on these features. In particular embodiments, the first or/and second set of features of the inspected samples may be extracted from corresponding X-ray images using, for example, but not limited to, a computer vision algorithm (e.g., based on reference models generated from adjacent samples), a statistical analysis algorithm, a machine-learning model, or any suitable algorithms. In particular embodiments, the inlier/outlier sample models may be characterized by corresponding machine-learning models associated a number of weights. In particular embodiments, the inlier/outlier samples models may be feature-based sample models, such as, vectors associated a number of features, sample parameters, and thresholds. In particular embodiments, the system may generate new models for the outlier samples with unknown defects based on the new knowledge learned by the computer algorithms, machine-learning models, or/and inputs from human operators. In particular embodiments, the newly classified samples may be used to update existing sample models or/and train machine-learning models to improve the classification accuracy and precision over time.

Quality Metric Based on Feature Space

In particular embodiments, the system may use a quality metric (e.g., a quality score) to indicate the quantified quality level or healthiness level of the inspected samples. For example, the system may determine a quality score for each inspected sample based on a corresponding location of that sample in the feature space and a distance to a reference point (e.g., a center point or an average point of inlier samples) of the feature space. The system may determine whether a sample is a conforming sample or non-conforming samples by comparing that quality score to a predetermined threshold. For the conforming samples, the system may use the quality score to indicate the quantified quality levels of these samples. The conforming samples having higher quality scores may have a higher quality level than some other conforming samples (e.g., being closer in the feature space to a reference point or an average point) having lower quality scores. As an example and not by way of limitation, as shown in FIG. 2A, the system may determine distance values of D1, D2, D3, and D4 for the inspected samples 219, 212, 212, and 214, respectively, with respect to the center point 215 of the inlier samples. The system may determine that, although the samples 213 and 214 are both conforming samples, the sample 213 has a smaller distance D3 to the average center point 215 than the sample 214 (which has distance D4). The system may determine that the sample 213 may have a higher quality score than the sample 214. The system may determine that the sample 214 may have a relatively lower reliability in long term although it may be fully functional at the time of this inspection based on a determination that the sample 214 is near the boundary condition 210 (e.g., within a threshold distance).

Initial X-ray Images Stored in Database

In particular embodiments, the X-ray inspection system may store the initial inspection data (e.g., X-ray images, extracted features, quality metrics, etc.) of the inspected samples in a database. This initial inspection data may be stored for a period of time as required by the regulations of particular industry. For example, the system may store the initial inspection data for at least 20 years for automobile industry. This initial inspection data may be stored in a local database of the X-ray system or a cloud-based remote server computing system and may be accessed by the system for re-examination purpose. For example, the X-ray images stored in the database may be retrieved and re-analyzed based on information learned from failure analysis of failed components to precisely identify a subset of components that may have the same or similar problems to the failed components, as described in later sections of this disclosure, Failure Analysis for Returned Products Failure Analysis of Failed Components When some products fail after being used for a period of time (e.g., months, years) in field applications, the failed products may be returned to the manufacturers for failure analysis. The failed products may be disassembled to isolate the failed components or parts. The failed components may be further analyzed (e.g., using electric test, human inspection, X-ray inspection, optical inspection, etc.) to identify the associated failure modes, root causes, and indicative features that are correlated to these failure modes (and therefore can be used to identify the component that have similar problems). For example, a failed automobile part may include an electronic component that has a failed electrical connection. The failed component may have passed all tests and inspections for quality control before that component is integrated into the automobile part and applied to the field application. The failed component may have failed during the field application because of one or more un-identified defects or/and factors in the field application (e.g., physical wear, damage, deformation, heat, etc.). In particular embodiments, the failed components may be tested or inspected by an electric test tool, an optical inspection system, an X-ray inspection system, or a human expert to identify one or more failure modes associated with the failed components and one or more indicative features that are correlated and indicative to the associated failure modes. In particular embodiments, the indicative features that are correlated and indicative to these failure modes may be determined based on inspection on a single failed component or a number of failed components that have the same or similar failure modes.

Indicative Features

In particular embodiments, the failure modes associated with the failed components may be associated with one or more defect types as described in earlier sections of this disclosure. In particular embodiments, the indicative features that are correlated to one or more failure modes may be the same or similar to one or more features used for classifying inspected components during the initial X-ray inspection for quality control. For example, the indicative features may include one or more features from the first set of features that are used to classify the inspected components into conforming samples and non-conforming samples. As another example, the indicative features may include one or more features from the second set of features that are used for classifying the inspected non-conforming samples into different defect categories, as described in earlier sections of this disclosure. As another example, the indicative features may include a combination of features selected from both the first set of features and the second set of features used for classifying the inspected components. In particular embodiments, the indicative features that are correlated to one or more failure modes of the failed component may be associated with, for example, but not limited to, one or more dimensions (e.g., length, width, height, thickness) of one or more sub-components or elements of the failed components, one or more positions and relative positions (e.g., alignment) of one or more elements, element shapes and sizes, one or more thresholds for one or more associated parameters, etc. In particular embodiments, the sub-components or elements of the failed components that are associated with the indicative features may include one or more of, for example, but not limited to, a conductive trace, a solder ball, a pin, a PCB layer, a PTV, a substrate, a sub-module or chip, etc.

As an example and not by way of limitation, a failed component may have a failed electrical connection associated with a low quality solder joint. The low quality solder joint may have passed the quality control test or inspection after the component is manufactured and before the component is applied to the field application. The low quality solder joint may correspond to a location in an associated feature space with the location being close to the boundary condition of conforming components (e.g., within a threshold distance to the boundary condition). In this example, the corresponding location of the low quality solder joint in the feature space may be used as the indicative features for this type of low quality solder joint. As another example and not by way of limitation, a failed component may have a failed electrical connection that is worn or damaged during the field application. The failed electrical connection may be associated with a particular location that may have frequent physical contacts to other parts during the field application. The system may determine one or more parameters (e.g., material thickness, element dimensions) and associated thresholds related to that particular location of the failed electrical connection as the indicative features for this particular failure mode caused by wear or damage of physical contacts.

As another example and not by way of limitation, a failed component may have a shorted electrical connection between two solder balls. The two solder balls may have passed the test or inspection for quality control before the associated component is applied in the field application but may have a small distance (e.g., smaller than a threshold distance). During the usage of the field application, the physical deformation of the component may cause the two solder balls to contact each other and result in the shorted electrical connection. The distance between the two solder balls and the associated thresholds may be used as the indicative features for this particular failure mode. As another example and not by way of limitation, a number of failed components having the same failure mode(s) may be associated with the same or similar process parameters (e.g., a temperature range of a heat chamber during the bonding process, an intermediate time duration range before the components are put into the heat chamber) during the manufacturing process. These process parameters and the associated threshold ranges may be used as the indicative features for the failure models associated with these failed components.

Determine Indicative Features Based on Original X-ray Images

In particular embodiments, to determine the indicative features for the failure modes of the failed components, the system may re-examine the original X-ray images of the failed components that are captured during the initial X-ray inspection for quality control (e.g., during or after the manufacturing process of this component) before that component is applied into the field application. The system may determine one or more indicative features that are correlated to the failure modes of the failed component by re-examining of the original X-ray images of the failed components. In particular embodiments, the system may access and retrieve, from a database, the original X-ray images of the failed components that are generated during the initial X-ray inspection (e.g., during or after a manufacturing process for quality control). The system may extract (e.g., using a machine-learning model or a rule-based algorithm) a set of features from the retrieved X-ray images and determine a correlation between the extracted set of features and one or more failure modes of the failed components. The system may identify (e.g., using a machine-learning model or a rule-based algorithm) the features that are correlated to the failure modes of the failed components as the indicative features. The indicative features may be used to identify other components that are associated with the same or similar failure modes. There indicative features may include features that are ignored by the X-ray inspection algorithm during the initial X-ray inspection process for quality control. In particular embodiments, the indicative features extracted from the original X-ray images that are generated during the initial inspection may be different features with respect to the first set of features and the second set of features used for classifying the inspected samples during the X-ray inspection process for quality control. In particular embodiments, the indicative features may include one or more features selected from the first set of features or the second set of features or a combination of features selected from the first and second set of features. The system may use the indicative features to identify other components that are similar to the failed components. These similar components may have the same problems with the failed components and may fail in a way that is similar or same to the failure modes of the failed components. In particular embodiments, the system may use the machine-learning model to determine and select a combination of features which are correlated to one or more failure modes of the failed components and use the selected features as the indicative features to identify components that may have the same or similar problems.

Determine Indicative Features Based on Newly X-Ray Images

In particular embodiments, the X-ray inspection system may be used for the failure analysis of the failed components. The system may capture new X-ray images for the failed components during the failure analysis process. The newly captured X-ray images may reflect the failed state of the failed components. The newly captured X-ray images may include a top-down X-ray image or several X-ray images captured from different angles for each failed component. The system may determine one or more failure modes (e.g., a disconnected solder joint, a disconnected pin) of the failed components based on the newly captured X-ray images. The system may determine (e.g., using a machine-learning model or a rule-based algorithm) and extract a set of features from the newly captured X-ray images, and determine the correlation of the extracted features to one or more of the failure modes of the failed components. The features that are correlated to one or more of the failure modes of the failed components may be used as the indicative features for the associated failure modes. These indicative features may be used to identify other components that have or are predicted to have the same or similar failure modes. In particular embodiments, the indicative features may include one or more features that are ignored by or unknow to the X-ray inspection algorithm used for the initial X-ray inspection for quality control.

Determine Indicative Features by Other Inspection Systems or Expert Inputs

In particular embodiments, the X-ray inspection system may determine one or more indicative features that are correlated to one or more failure modes of the failed components based on information received from other inspection systems (e.g., an optical inspection system, an electrical test system) that is used for the failure analysis of the failed component. As an example and not by way of limitation, another inspection system (e.g., an optical inspection system, an electrical testing system) may be used in the failure analysis process to identify one or more failure modes associated with the failed components and one or more indicative features that are correlated to these failure modes. These inspection systems may send the failure analysis results including the indicative features and the failure mode information to the X-ray inspection system which may inspect future components based on the received failure modes and corresponding indicative features. In particular embodiments, the X-ray inspection system may receive one or more indicative features that are correlated to one or more failure modes of the failed components from human experts who perform the failure analysis of the failed component. As an example and not by way of limitation, the human experts may disassemble the failed component and manually inspect the failed component (e.g., visually by human eyes, or using one or more diagnosis tools). The human experts may manually determine one or more failure modes associated with the failed components and determine one or more indicative features that are correlated to the failure modes. Then, the human experts may input the failure analysis results including the indicative features and the failure mode information to the X-ray inspection system. The X-ray inspection system may receive the analysis results from the human experts and may inspect future components based on these failure models and indicative features.

Determine Indicative Features Based on Difference of Original and New X-Ray Images In particular embodiments, the X-ray inspection system may analyze (1) the original X-ray images of the failed components that are captured before these components are applied to field applications, and (2) the newly captured X-ray images of the failed components during the failure analysis (after these components have failed). Since the components may have some changes like degradation after being used for a period of time, the newly captured X-ray images of these failed components may be different from the original X-ray images of these components (corresponding to a state before being applied to the field application). In particular embodiments, the system may determine one or more indicative features that are correlated to one or more failure modes of the failed components based on the similarity and difference between the original X-ray images and the newly captured X-ray images corresponding to the same components. As an example and not by way of limitation, the system may determine one or more features that are associated with a degradation or wear in the failed components by comparing the original X-ray images and the newly captured X-ray images during the failure analysis. The degradation or wear may be a reason that caused the failure of the failed components. The system may use the determined features as the indicative features for identifying other components having the same or similar problems. As another example and not by way of limitation, the system may identify a degradation or wear of the failed components which may not be the reason that caused the failure of the failed components but may eventually cause failure of these components if these components are used for a longer time in the field application. The system may identify one or more potential failure modes based on the identified degradation or wear and determine one or more indicative features that are correlated to these potential failure modes.

Determine Indicative Features Based on Degraded Components

In particular embodiments, the system may inspect one or more components that have been used in field applications for a period of time and are still functional (instead of having failed) but have been degraded, worn, or damaged during the usage in the field applications. The degradation or wear of these components may not yet cause these components to fail but may eventually cause these components to fail if these components are used for longer time in the field application. The system may capture new X-ray images of these components and compare these new X-ray images to respective original X-ray images that are captured before these components are applied to field applications. The system may determine the degradation or wear in the components or components portions based on the comparison results and determine one or more potential failure modes that are predicted to happen in future. Then, the system may determine one or more indicative features that are correlated and indicative to these potential failure modes and use these indicative features to inspect other components to identify the components that may have these potential problems.

Adjust X-Ray Inspection Algorithms to Increase Defect Detection Sensitivity

Framework for Adjusting X-Ray Inspection Algorithms

Figure 3:
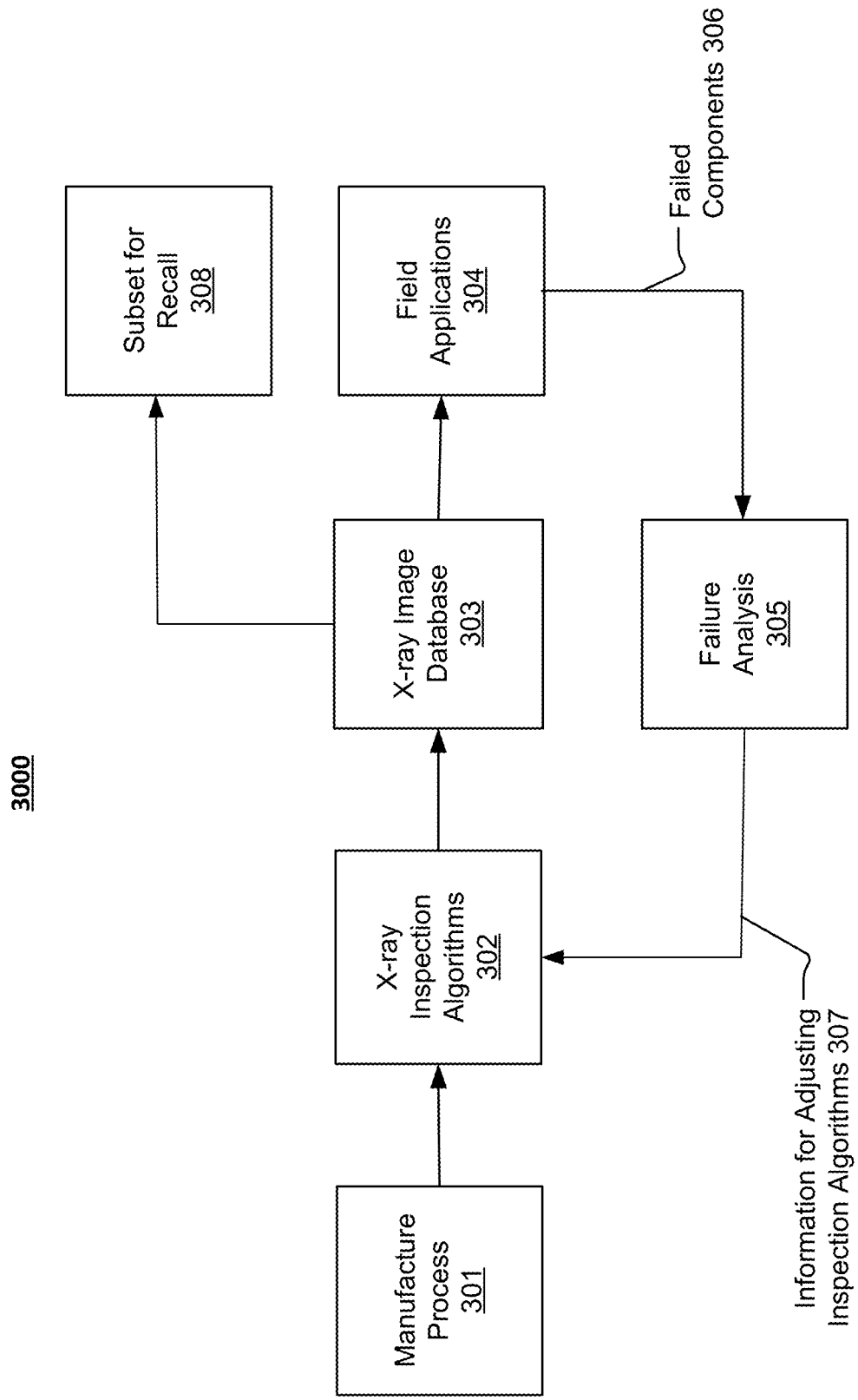
FIG. 3 illustrates an example framework for adjusting X-ray inspection algorithms based on knowledge learned from failure analysis of failed components.

FIG. 3 illustrates an example framework 3000 for adjusting X-ray inspection algorithms based on knowledge learned from failure analysis of failed components. In particular embodiments, the X-ray system may adjust or modify the X-ray inspection algorithms based on the knowledge learned from the failure analysis of the failed components. The adjusted or modified inspection algorithm may include, for example, but are not limited to, a rule-based classification algorithm, a machine-learning model for classifying inspected components, a machine-learning model for extracting features from X-ray images, a computer algorithm for statistical analysis, a computer vision algorithm for extracting features, etc. The system may analyze the failed components 306 that are returned from the field application 304 during a failure analysis process 305. The system may determine the failure modes of the failed components and the indicative features that are correlated and indicative to these failure modes. The system may determine the information needed for adjusting the X-ray inspection algorithm 307 and adjust or modify the inspection algorithms 302 accordingly. Then, the system may use the adjusted X-ray inspection algorithms to re-examine the original X-ray images stored on the X-ray images database 303. The system may identify a subset of components for recall 208 including non-conforming components from the previously inspected components.

Adjusting/Adding Rules Based on Indicative Features

In particular embodiments, the X-ray inspection system may use the new knowledge learned from the failure analysis of the failed components to adjust the classification algorithms for classifying inspected components. In particular embodiments, the system may use a rule-based algorithm to classify the inspected components into conforming components and non-conforming components of different defect categories. The rule-based algorithm may classify the inspected components based on a number of pre-determined rules. During the failure analysis process of the failed components, the system may determine one or more indicative features that are correlated to one or more failure modes of the failed components based on original X-ray images of the failed components, new X-ray images of the failed components, analysis results received from other inspection systems or human experts, etc. In particular embodiments, the system may adjust one or more existing rules of the rule-based classification algorithm based on the indicative features that are correlated to the failure modes. In particular embodiments, the system may generate one or more new rules for classifying inspected components based on the indicative features and add these new rules to the rule-based algorithm. The rule-based classification algorithm with the adjusted rules or the newly added rules may classify inspected components based on the new knowledge (e.g., indicative features correlated with the failure modes) learned from the failure analysis of the failed components. The rule-based classification algorithm with the adjusted rules or the newly added rules may classify the components that are associated with one or more of the indicative features as non-conforming components. In particular embodiments, the system may create new defective categories or new high risk categories based on the indicative features correlated to one or more newly learned failure modes of the failed components and classify inspected components to these new categories when they have one or more related features or characteristics. In particular embodiments, the system may further predict failure probability and failure modes of these non-conforming components based on new knowledge (e.g., indicative features and failure modes) learned from the failure analysis process. In particular embodiments, the system may generate a new algorithm (e.g., an updated classification algorithm or a new classification algorithm) that is created based on the indicative features and the failure modes learned from the failure analysis process of the failed components to classify inspected components.

Re-Train Machine-Learning Model

In particular embodiments, the system may use a machine-learning model to classify inspected components into conforming components and non-conforming components of different defect categories. The machine-learning model may classify the inspected components based directly on the corresponding X-ray images or based on a number of features extracted by another machine-learning model or computer vision algorithm from the corresponding X-ray images. In particular embodiments, the system may use the new knowledge learned from the failure analysis of the failed components to re-train the machine-learning model or a separate machine-learning model used for classifying the inspected components based on the new knowledge learned from the failure analysis process of the failed components. As an example of not by way of limitation, the system may use a machine-learning model to directly classify inspected components based on corresponding X-ray images. The machine-learning model may be fed with the X-ray images of the inspected components and may output the corresponding categories (e.g., conforming components, non-conforming components of different defect types) for the inspected components. In this scenario, the system may re-train the machine-learning model directly using a number of X-ray images of the failed components. The machine-learning model may adjust its weight values during the re-training process. The machine-learning model, once re-trained may classify future components that are similar (e.g., having the same or similar indicative features) to the failed components as non-conforming components.

As another example and not by way of limitation, the system may use a first machine-learning model (or a computer vision algorithm) to extract a number of features from the X-ray images of the inspected components. Then, the system may feed the extracted features to a second machine-learning model to classify the inspected components based on these features. During the failure analysis process of the failed components, the system may determine one or more indicative features that are correlated to one or more failure modes of the failed components based on original X-ray images of the failed components, new X-ray images of the failed components, analysis results received from other inspection systems or human experts, etc. The system may re-train the first machine-learning model or adjust the computer vision algorithm using the corresponding X-ray images to allow the first machine-learning model or the computer vision algorithm to extract the indicative features from the X-ray images of the inspected components. Then, the system may re-train the second machine-learning model based on these indicative features (and a number of other features). The second machine-learning model, once re-trained, may classify inspected components with these indicative features as non-conforming components.

Product Re-Examination and Failure Prediction

Re-Examine Previously Inspected Components

In particular embodiments, during a failure analysis process of failed components, the system may access, from a database, a first set of X-ray images that are labeled as being associated with the failed components and use the first set of X-ray images to learn new knowledge (e.g., failure modes of the failed components and indicative features correlated to these failure modes) related to the failed components. Then, the system may adjust one or more classification algorithms based on new knowledge and use the adjusted classification algorithms to classify future components or re-classify previously inspected components. In particular embodiments, after the classification algorithms have been adjusted based on the new knowledge learned from the failure analysis of the failed components, the system may access a second set of X-ray images of a number of components stored in the database, analyze these X-ray images, and classify the corresponding components using the adjusted classification algorithms. The X-ray images stored in the database may include X-ray images that are captured during an initial X-ray inspection process for quality control. The initial X-ray inspection may be performed during or after a manufacturing process of the corresponding components and before these components are applied in field applications. The X-ray images stored in the database may reflect the initial state of these components before they fail in the field applications. The second set of X-ray images may correspond to previously inspected components that are classified as conforming components during the initial X-ray inspection (before the classification algorithm is adjusted).

In particular embodiments, during the re-examination process, the system may re-analyze the X-ray images stored in the database and use the adjusted classification algorithm to re-classify the previously inspected components. As an example and not by way of limitation, the system may use the adjusted rule-based classification algorithm to re-classify the corresponding components based on the indicative features that are correlated to the failure modes of the failed components. The system may classify components that are associated with one or more indicative features as non-conforming components. The system may identify a subset of components including newly identified non-conforming components (e.g., as indicated by the indicated features) from the previously inspected components and generate a recall recommendation based on the identified subset of components. As another example and not by way of limitation, the system may use the re-trained machine-learning model to analyze the X-ray images stored in the database and re-classify the corresponding previously inspected components. The re-trained machine-learning models may classify the components that are similar (e.g., having the same or similar indicative features correlated to failure modes of the failed components) to the failed components as non-conforming components. The system may identify a subset of components including all newly identified non-conforming components and generate a recall recommendation based on the identified subset of components. The identified subset of components may include less components than the whole population of the previously inspected components. As another example and not by way of limitation, the system may use a first re-trained machine-learning model to extract features from the X-ray images of the inspected components. The extracted features may include the indicative features that are correlated to the failure models of the failed components. The system may sue a second re-trained machine-learning model to classify the inspected components based on these extracted features. The second re-trained machine-learning model may classify inspected components that have one or more of the indicative features as non-conforming components. The system may identify a subset of components including all newly identified non-conforming components and generate a recall recommendation based on the identified subset of components. The identified subset of components may include less components than the whole population of the previously inspected components, and therefore significantly reduce the cost of the recall.

Determine Component Similarity Based on Feature Space

In particular embodiments, the system may analyze the X-ray images of the inspected components to identify components that are similar to the failed components and predict a failure probability for the identified components based on the determined similarity between these components and the failed components. As an example and not by way of limitation, the system may identify suspicious components that have one or more features (e.g., one or more features of the first and second set of features used for classifying these components, one or more new features) which are similar (but may not be the same) to the indicative features that are correlated to the failure modes of the failed components. The system may compare these features to the indicative features and determine a quantified similarity metric for each suspicious component to quantify the similarity between the suspicious component and the failed components. When the similarity metric is above a pre-determined similarity threshold, the system may identify the corresponding suspicious components as non-conforming components that need fixing or replacement (even though they have been perfectly functional by the time of this re-examination). The system may identify, based on corresponding X-ray images, these non-conforming components from a number of previously inspected components that are labeled as conforming components during the initial X-ray inspection process.

In particular embodiments, the system may analyze the X-ray images of the inspected components to identify components that are similar to the failed components based on corresponding locations in a N-dimensional feature space as defined by N number of features (e.g., FIG. 2A-2B). Then, the system may predict a failure probability for each of identified components based on the determined similarity between that component and the failed components. As an example and not by way of limitation, the system may determine respective locations of the inspected components and failed components in the N-dimensional feature space as defined by the N number of features. The system may determine, for each inspected component, a distance in the N-dimensional feature space with respect to one or more of the failed components. Then, the system may determine a quantified similarity metric, for each inspected component to quantify the similarity between that inspected component and the failed components, based on the distance to one or more of the failed components in the N-dimensional feature space. A smaller distance to one or more of the failed components may correspond to a higher level of similarity. The system may compare the similarity metric to a pre-determined threshold. When the similarity metric is above the pre-determined similarity threshold, the system may identify the corresponding components as non-conforming components that need fixing or replacement (even though they may have been functional by the time of this re-examination). Then, the system may predict a failure probability, a future failure time, and a potential failure mode for each of the identified non-conforming components based on the associated similarity metric associated with these components and the corresponding failed components. A higher level of similarity to the failed components may correspond to a higher level of failure probability for an associated component.

In particular embodiments, the system may determine a similarity metric vector including n number of similarity metrics. As an example and not by way of limitation, the system may determine a first feature vector including x number of features associated with the failed components and a second feature vector including y number of features associated with a previously inspected component that is being re-examined. Then, the system may calculate the similarity vector including a number of similarity metrics based on the first feature vector and the second feature vector. In particular embodiments, each similarity metric of the metric vector may be determined based on a similarity level between a feature in the first feature vector and a corresponding feature in the second feature vector. In particular embodiments, the similarity metric vector may be determined based on correlation measurement between the first feature vector and the second feature vector. In particular embodiments, the system may calculate an overall similarity score based on the similarity metric vector. The overall similarity score may indicate the overall correlation between the first feature vector and the second feature vector indicating the overall similarity between that previously inspected component and the failed components. The system may compare the overall similarity score to a pre-determine threshold to determine whether the associated previously inspected component is similar enough to the failed components to be classified as non-conforming components. When the overall similarity score is greater than or equal to the pre-determined threshold, the system may adjust classification algorithms to reject that previously inspected component as non-conforming components.

Component Similarity Based on Process Parameter Space

In particular embodiments, the system may determine that the failed components are manufactured by a manufacturing process that is configured with a particular combination of process parameters associated with one or more manufacturing tools used in the manufacturing process. The system may identify the components, that are manufactured with process parameters being with the same ranges to the manufacturing process for the failed components, as the components that are similar to the failed components. As an example and not by way of limitation, integrated circuit packages may be processed in a heat chamber being configured to have particular temperature during a bonding process. The temperature of the heat chamber may affect the quality of the manufactured integrated circuit packages. The system may determine that the failed components are manufactured with the heat chamber being configured with a particular temperature range. The system may identify these components that are manufactured with the same temperature range as non-conforming components. The system may predict that these non-conforming components may have the same failure modes with the failed components and may have a high probability of failure (e.g., being higher than an acceptable probability threshold) in a future time as determined based on failure information related to the failed components.

As an example and not by way of limitation, the integrated circuit packages may be kept out of a heat chamber for a particular time duration before being put into the heat chamber during a bonding process. The intermediate time duration may affect the quality of the manufactured integrated circuit packages. The system may determine that the failed components are associated with a particular intermediate time duration range during the manufacturing process. The system may identify components that are associated with the same intermediate time duration range as the components that are similar to the failed components. The system may identify these components that are associated with the same intermediate time duration as non-conforming components. The system may predict that these non-conforming components may have the same or similar failure modes with the failed components and may have a high probability of failure (e.g., being higher than an acceptable probability threshold) in a future time as determined based on failure information related to the failed components.

In particular embodiments, the inspected components may be manufactured during a manufacturing process using one or more manufacturing tools being configured with a number of process parameters. In particular embodiments, the system may analyze the X-ray images of the inspected components to identify components that are similar to the failed components based on a M-dimensional process parameter space as defined by M number of process parameters. In particular embodiments, the system may determine respective locations of the inspected components and failed components in a M-dimensional process parameter space as defined by the M number of process parameters. The system may determine a distance from each inspected component, in the M-dimensional process parameter space, to one or more of the failed components. Then, the system may determine a quantified similarity metric for each inspected component to quantify the similarity between that inspected component and the failed components based on its distance to one or more of the failed components in the M-dimensional process parameter space. The system may compare the similarity metric to a pre-determined similarity threshold. When the similarity metric is above the pre-determined similarity threshold, the system may identify the corresponding component as a non-conforming component that may need fixing or replacement (even though it may have been functional by the time of this re-examination). Then, the system may predict a failure probability, a future failure time, and a potential failure mode for each of the identified non-conforming components based on the associated similarity metric between these components and the failed components. A higher level of similarity to the failed components may correspond to a higher level of failure probability for an associated component.

Inspect New Components Using Adjusted Inspection Algorithms

In particular embodiments, the system may use the adjusted inspection algorithms (e.g., a rule-based classification algorithm, a machine-learning model for classifying inspected components, a machine-learning model for extracting features from X-ray images, a computer algorithm for statistical analysis, a computer vision algorithm for extracting features) to inspect new components that are manufactured during a manufacturing process to reject the components that are similar to the failed components (e.g., having one or more indicative features). The new components may be inspected using the adjusted inspection algorithms during a quality control inspection after or during the manufacturing process. In particular embodiments, the system may use the adjusted inspection algorithms to inspect used components that are returned from field applications. These uses components may include failed components or components that are still functional. The system may identify a subset of components including the failed components and the components that are predicted to fail using the adjusted inspection algorithms.

Predict Failure Probability and Failure Modes

In particular embodiments, the system may determine a probability of failure for each previously inspected component based on the re-examination results. The probability of failure of a previously inspected component may be determined based on the similarity (e.g., a quantified similarity metric value) between that component and the failed components. The system may compare the predicted probability of failure of the previously inspected components to a pre-determined threshold. When the probability of failure is above the pre-determined threshold, the system may identify the corresponding component as a problematic component that may need fixing or replacement (even though they have been perfectly functional by the time of this re-examination). By re-examining the X-ray images stored in the database, particular embodiments of the system may precisely identify the products that may need fixing or replacement. As a result, manufacturers may be able to recall or fix a much smaller number of products while achieving the same level of safety (e.g., recalling hundreds of products that are identified to have these problems rather than millions of products that are of the same model).

In particular embodiments, the system may predict one or more failure modes for the components that are identified as problematic (e.g., have a high probability of failure). As an example and not by way of limitation, a problematic component may be identified to be similar (e.g., having a similarity metric being higher than a pre-determined threshold) to failed components having a particular failure mode. The system may predict that the problematic component may fail with that particular failure mode if it used in the field application for a longer time. In particular embodiments, the system may predict a failure time for a problematic component based on one or more quality metrics associated with that problematic components and the similarity metric associated with that problematic components with respect to the failed components. As an example and not by way of limitation, the system may predict that a problematic component will fail within a year if it is continuously allowed to be used in the field application based on the usage time of the failed components.

Feedback and Feedforward for Process Control

Determine Root Causes in Manufacture Process

In particular embodiments, the system may determine corresponding root causes in the manufacturing process that lead to the defects or imperfectness that caused the failure of these failed components. In particular embodiments, the root causes may be associated with, for example, but not limited to, drifted parameters of manufacture tools, misalignments, over-drilling or under drilling of PTVs by a drilling machine, out-of-range temperature of a heat chamber, out-of-range intermediate time duration before being put into a heat chamber, etc. As an example and not by way of limitation, the system may determine that the defects or imperfectness in the failed components that caused these components to fail in the field application. The system may identify one or more drifting process parameters that lead to these defects or imperfectness in the failed components. The drifting process parameters may be associated with one or more manufacturing tools used in the manufacturing process including, for example, but not limited to, a bonding tool, a heating chamber, an assembling tool, a drilling machine, thermo-compression bonding tool, etc. In particular embodiments, the drifting process parameters may be determined based on one or more failure modes of the failed components and may be related to one or more component parameters including, for example, but not limited to, the shapes of solder joints at individual solder joint level, diameters, Z-axis thickness, sizes of the solder joints, distances between solder balls, etc. The system may generate feedback or/and feedforward information based on the determined root causes and send the feedback or/and feedforward information to the associated manufacturing tools to adjust corresponding process parameters of the manufacturing process. For example, the system may send feedback information to an assembling tool to adjust the drifting parameter and keep that parameter from drifting during the assembling process.

In particular embodiments, the problems (e.g., defects, faults or imperfectness that cause failure) in the failed components may be caused by interactions of multiple parameters that deviates from specification requirements in the manufacturing process. There may be no obvious correlations between the identified defects and the parameters of the manufacturing tool that cause the defects. Traditional inspection technologies may not able to determine which variables have caused the defects. In particular embodiments, the system may use a machine-learning model, which are trained by historical data, to identify the root causes of the defects of the non conforming components that are identified during the re-examination process. The system may use a sample population manufactured or processed under certain process conditions to train the machine-learning model. During the training process, the machine-learning models may adjust its weights to characterize the boundary conditions of conforming samples as defined by the training sample population. The machine-learning model, once trained, may be highly sensitive to the parameters in the inspected components and parameter changes in the manufacturing process. During the re-examination process, the system may use the trained machine-learning model to identify the parameter changes and drifts of the manufacturing tool and the manufacturing process. The machine-learning models may determine the corresponding root cause parameters related to the manufacturing tool and the manufacturing process. Then, the system may send instructions or data to the associated manufacture tools to pause the manufacturing process and adjust the corresponding parameters of these manufacture tools. In particular embodiments, the system may send the instructions or data to the manufacture tool to automatically adjust the corresponding parameters of the manufacture tool without pausing the manufacturing process.

Generate Feedback/Feedforward Information

In particular embodiments, the system may determine feedback or/and feedforward information to adjust one or more steps of the manufacturing process or inspection process. In particular embodiments, the feedback or/and feedforward information may be determined based on, for example, but not limited to, failure modes of failed components, indicative features correlated to these failure modes, root causes of defects in failed components, or status of the manufacturing tools or inspection tools. In particular embodiments, the feedback or/and feedforward information may include instructions or data that could cause the corresponding tools to adjust one or more parameters that are related to the root causes leading to the defects of the failed components. The manufacturing tools with the adjusted parameters may have a lower probability to produce new components with the same or similar problems. The inspection tools with the adjusted parameters may be capable to identify the components that are similar (e.g., having the same or similar indicative features) to the failed components. In particular embodiments, the system may cause one or more additional inspection steps to be included in the inspection process. The additional inspection steps may be capable to detect the components that have the same or similar problems with the failed components. In particular embodiments, the system may cause one or more additional manufacturing steps to be included in the manufacturing process. The addition manufacturing steps may eliminate or correct the defects in the manufactured components. In particular embodiments, the X-ray inspection system may include one or more compute processors, either within an X-ray machine or remote to an X-ray machine, that process the feedback/feedforward information that is provided to these tools. In particular embodiments, the provided feedback/feedforward information may be communicated using any communication methods including, for example, but not limited to, over a local area network (e.g., a wired network or wireless network), over a telecommunication network, through an intermediary computer, etc.

Feedback and Feedforward Process

Figure 4:
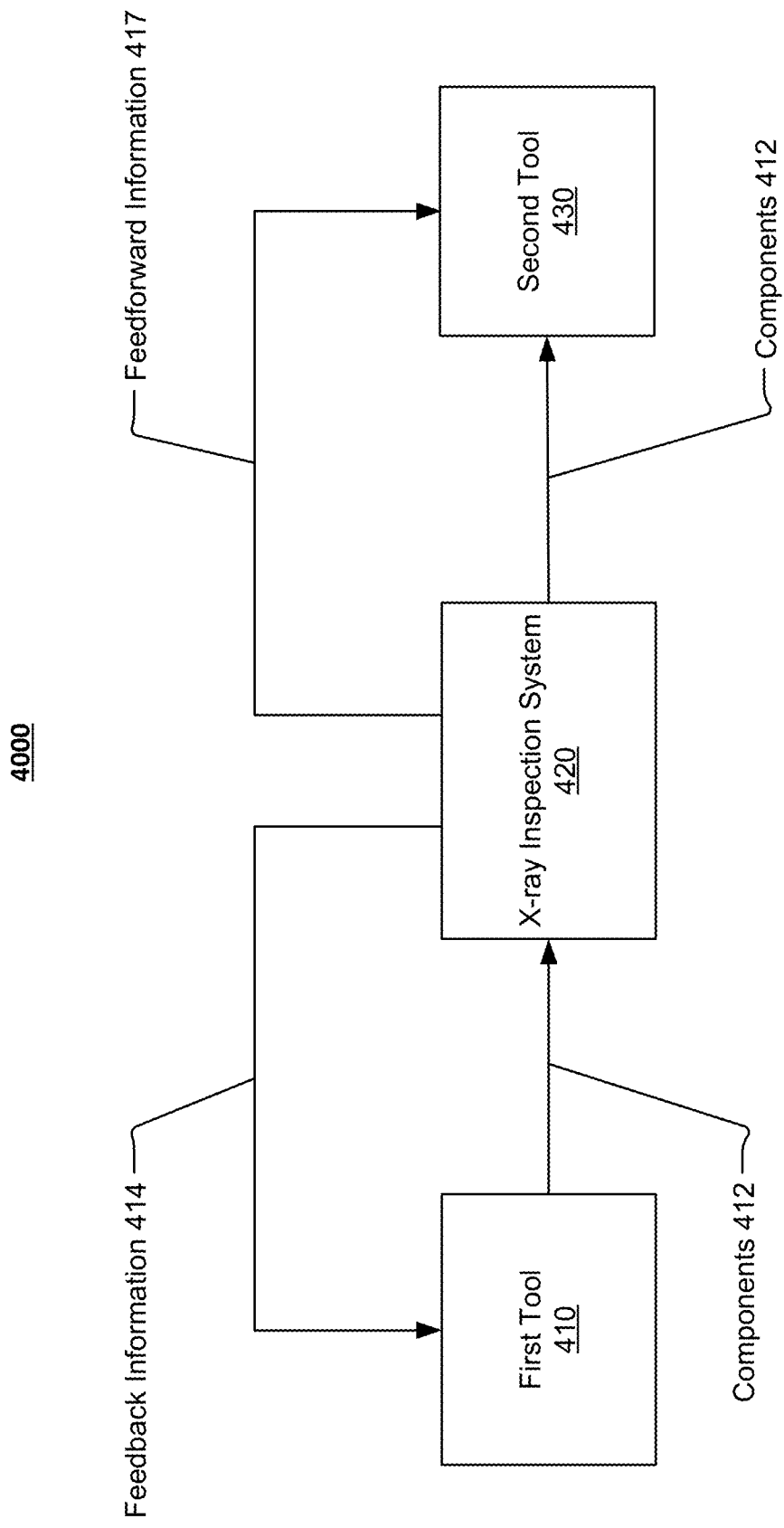
FIG. 4 illustrates an example framework for adjusting manufacturing process parameters based on feedback or feedforward information from X-ray inspection system.

FIG. 4 illustrates an example framework 4000 for adjusting manufacturing process parameters based on feedback or feedforward information from X-ray inspection system. In particular embodiments, a first tool 410 may be used to process electronic components during the manufacturing process of these electronic components. In particular embodiments, the first tool 410 may be, for example, but is not limited to, an assembling tool, a bonding tool, a placement tool, a drilling machine, a thermo-compression bonding tool, etc. The first tool 410 may be used to process the produced components 412 in one or more steps of the manufacturing process. In particular embodiments, the X-ray inspection system 420 may inspect the components 412 that are processed by the first tool 410 inline or/and in situ with the first tool 410 for processing the components 412. The system 420 may capture X-ray images of the components 412, use the adjusted inspection algorithms (e.g., computer vision algorithms or/and machine-learning models) to analyze the captured X-ray images, and generate metrology information about the inspected components 412. When the system 320 detects one or more defects in the inspected components 412 or determines that one or more sample parameters of the inspected components 412 have deviated from specification (e.g., being outside pre-determined threshold ranges), the system 420 may send feedback information 414 to the first tool 410 to adjust one or more process parameters associated with the first tool 410 and the manufacturing process based on the metrology information. In particular embodiments, the system 420 may perform the X-ray inspection and send the feedback information 414 to the first tool 410 in real-time while the components 412 are processed by the first tool 410. The first tool 410, after received the feedback information 414, may adjust one or more process parameters associated with the manufacturing process. The first tool 410 with the adjusted parameters may have a lower probability for producing defective components (e.g., components with indicative features correlated to failure modes of the failed components, components with parameters being outside the pre-determined ranges as defined by specification requirements).

In particular embodiments, the X-ray inspection system 420 may cause the first tool 410 to use the inspection and measurement results to automatically adjust process parameters without stopping the first tool 410 for processing samples. In particular embodiments, the X-ray inspection system 420 may cause the first tool 410 to pause the production process and make necessary changes in one or more process parameters to restore the process to the desired quality level. In particular embodiments, the X-ray inspection system 420 may perform in situ measurement to the first tool 410 and provide in situ feedback to the first tool to adjust one or more parameters related to the manufacturing process. In particular embodiments, the X-ray inspection system 420 may perform inline inspection or measurement in the manufacturing process and provide feedback information to the first tool 420 or an operator of the first tool 420 to adjust parameters of the manufacturing process. By using this in situ or/and inline inspection and feedback, particular embodiments of the system may cause the manufacturing process to adjust one or more process parameters that affect the quality of the manufactured products, and therefore reduce the quantity of defective parts during the manufacturing process. In particular embodiments, the system may control the quality of production parts in a more narrowly defined specification range, and therefore reduce the defective rate of the manufactured products to, for example, 1 part per billion.

In particular embodiments, the X-ray inspection system 420 may provide feedforward information 417 to a second tool 430 that will process these components in one or more subsequent steps of the manufacturing process. In particular embodiments, the second tool 430 may be, for example, but is not limited to, an assembling tool, a bonding tool, a placement tool, a drilling machine, a thermo-compression bonding tool, etc. In particular embodiments, the X-ray inspection system 420 may inspect the components 412, which will be processed by the second tool 430 in one or more subsequent steps of the manufacturing process, inline or/and in situ with the second tool 420 for processing the samples 412. The X-ray inspection system 420 may capture X-ray images of the components 412, use the adjusted inspection algorithms (e.g., computer vision algorithms or/and machine-learning models) to analyze the captured X-ray images, and generate metrology information about the inspected samples 412. When the X-ray inspection system 420 detects one or more defects in the inspected samples 412 or determines that one or more parameters of the inspected samples 412 have deviated from specification for a threshold difference (e.g., being outside pre-determine ranges), the X-ray inspection system 420 may send feedforward information 417 to the second tool 430 to adjust one or more parameters associated with the second tool 430 of the manufacturing process based on the metrology information. The second tool 430, after received the feedback information 414, may adjust one or more process parameters associated with the manufacturing process. In particular embodiments, the second tool 430 after having its parameters being adjusted, may process subsequent samples in a subsequent step of the manufacturing process and may have a lower probability for producing defective components (e.g., components having indicative features correlated to the failure modes of the failed components, components with parameters deviating from the specification requirements). In particular embodiments, the X-ray inspection system 420 may perform the X-ray inspection and send the feedforward information 417 to the second tool 430 in real-time while the samples 412 are processed by the second tool 430 in a subsequent step of the manufacturing process.

Feedback Example: Adjust Bonding Process Parameters

In particular embodiments, the system may use the X-ray inspection algorithms that are adjusted based on the new knowledge learned from the failed components to classify inspected components based on a M-dimensional process parameter space as defined by M number of process parameters associated with the manufacturing process of these inspected components. Each component category may correspond to a manufacturing process with particular process parameters (e.g., intermediate time duration before putting the samples into a heating chamber and temperature within the heating chamber during the bonding process). As an example and not by way of limitation, the inspected samples may be electronic components manufactured or assembled using a bonding tool. The electronic components may be put into a heating chamber for bonding after being assembled and aligned. The assembled components may be put on different lots of the chamber. The electronic components may require the chamber temperature to be within the range of, for example, 400±50 degrees during the bonding process for qualified bonding results and may require to be put into the chamber within, for example, 1 hour after assembled. The variation of the temperature and intermediate time duration may cause product quality variation (even when the variation of the temperature and intermediate time duration are within the required ranges and the products pass the electrical test). In particular embodiments, the system may use the X-ray inspection algorithms that are adjusted based on new knowledge learned from the failed components to evaluate the quality of inspected components and provide information for adjusting one or more parameters of the manufacturing process.

Figure 5:
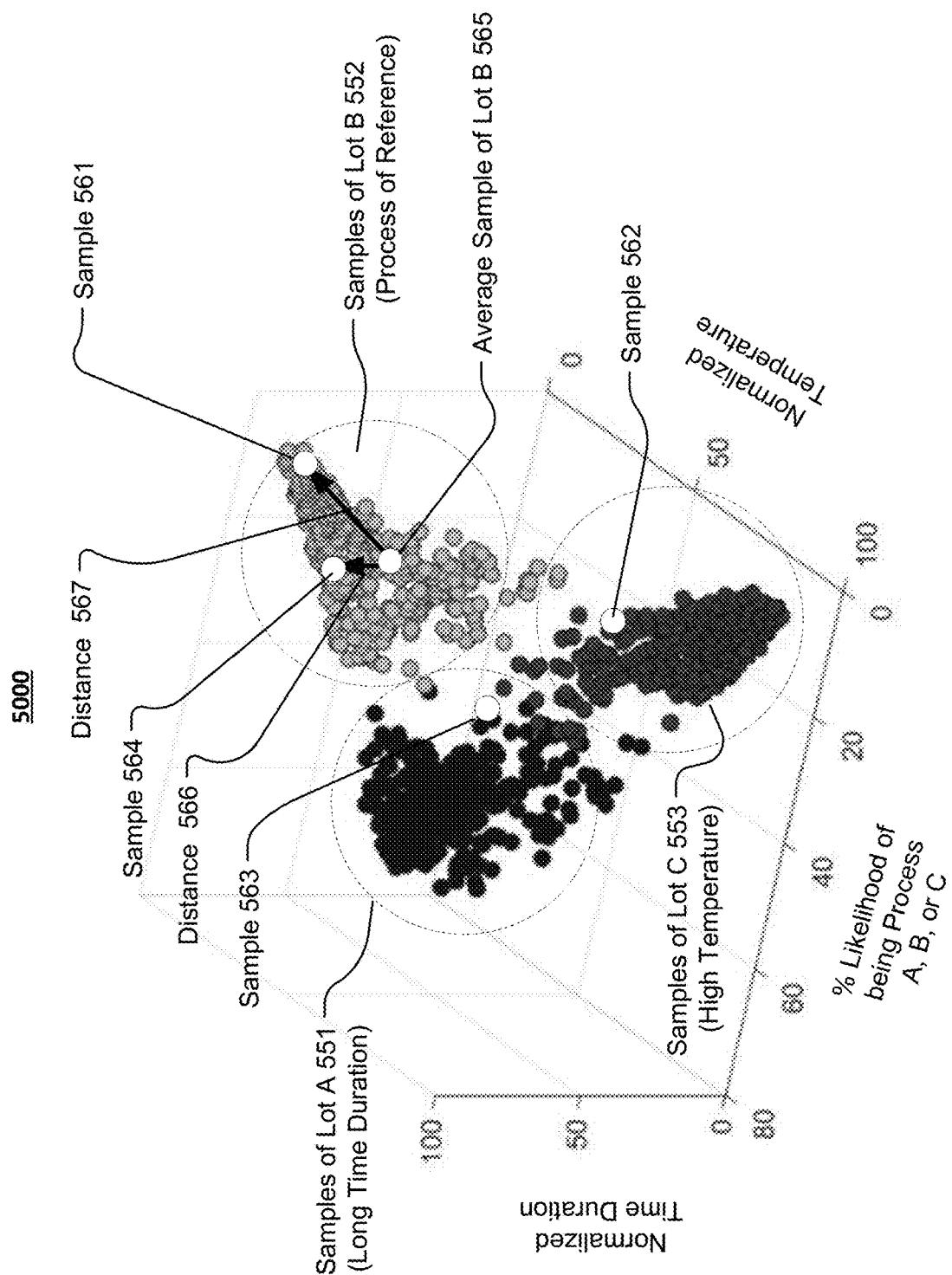
FIG. 5 illustrates an example process for classifying inspected samples into different categories based on a process parameter space.

FIG. 5 illustrates an example process 5000 for classifying inspected samples into different categories based on a process parameter space. In particular embodiments, the X-ray inspection algorithm may be a machine-learning model trained by training samples of a number of sample categories each corresponding to a different set of parameter values for the manufacturing process. As an example and not by way of limitation, the machine-learning model may be fed with a number of X-ray images of a number of training samples with known manufacturing process parameters. For example, the samples of Lot A 551 may include samples that are put into the chamber after more than 1 hour (e.g., 2 hours) after being assembled and have a standard chamber temperature of 450 degrees during the bonding process. The samples of Lot B 552 may include samples that are manufactured with parameters of a process of reference (POR) with a temperature of 400 degrees during the bonding process and an intermediate time duration of 1 hour before the samples are put into chamber. The samples of Lot C 553 may include samples that have higher chamber temperature (e.g., a highest limit of the required temperature range 450 degrees) during the bonding process and standard intermediate time duration of 1 hour. The manufacturing process parameters of these samples (e.g., Lot A, Lot B, and Lot C) may be known and labeled for the corresponding X-ray images. The system may extract a set of features for the training samples from the corresponding X-ray images (e.g., using machine-learning models or computer vision algorithms) and feed the extracted features to the machine-learning models during a training process. One trained, the system may use the machine-learning models to classify inspected samples into different sample categories with each category corresponding to a sample lot (which corresponds to a particular combination of manufacturing process parameters).

In particular embodiments, once trained, the machine-learning model may be used to classify new samples (e.g., samples 561, 562, 563, and 564) based on corresponding X-ray images. The machine-learning model may extract a set of features from the X-ray images of the new samples (e.g., samples 561, 562, 563, and 564) and compare these features to the features of the known samples in each category to classify these new samples. For example, the machine-learning model may compare the features of the samples 561 and 564 to the features of the samples of the three lots and determine the corresponding likelihood percentage values of the samples 561 and 564 for each category. When the samples 561 and 564 meet the boundary criterion of Lot B (e.g., likelihood percentage values being above the corresponding threshold), the machine-learning model may classify the samples 561 and 564 into the sample category of Lot B 552. As another example, the machine-learning model may compare the features of the samples 562 and 563 to the features of the samples of Lot C 553 and Lot A 551, respectively and determine the respective likelihood percentage values. The machine-learning model may determine that the samples 562 and 563 meet the boundary criteria (e.g., respective likelihood percentage above corresponding thresholds) of the sample categories Lot C and Lot A, respectively. The machine-learning model may classify the samples 562 and 563 into the sample category of Lot C 552 and Lot A 551, respectively.

In particular embodiments, the machine-learning model may determine a probability of failure for an inspected sample based on the manufacturing process associated with the corresponding sample category. For example, for the samples 561 and 564 classified into the sample category of Lot B 552, the system may determine that the manufacturing process of the samples 561 and 564 may have the same or similar parameters to the process of reference (e.g., a temperature of 400 degrees during the bonding process and an intermediate time duration of 1 hour before being put into chamber). The machine-learning model may determine a probability of failure for the samples 564 and 561 based on the failure rate or defect rate of the samples manufactured by the process of reference (e.g., 1 part per million). As another example, the system may determine that the manufacturing process of the samples 562 and 563 may have the same or similar parameters to the manufacturing processes associated with Lot C and Lot B. The machine-learning model may determine a probability of failure for the samples 562 and 563 based on the failure rates or defect rates of the samples of Lot C and Lot B (e.g., 100 parts per million). Since all the samples (or similar samples) of Lot A, Lot B, and Lot C may pass the electrical test and be fully functional, all these samples may be included in the end products. Particular embodiments of the system may predict the likelihood of failure, the life span, and the possible failure modes for these samples included in the end products.

In particular embodiments, the system may determine the parameters of the manufacturing process of the inspected samples based on the sample classification results. For example, the system may identify that the inspected sample 564 is manufactured by a process of reference based on a determination that the inspected sample is classified into the sample category of Lot B 552. As another example, the system may identify that the inspected sample 563 is manufactured by a process with longer intermediate time duration based on a determination that the inspected sample is classified into the sample category of Lot A 551. As yet another example, the system may identify that the inspected sample 562 is manufactured by a process with higher chamber temperature based on a determination that the inspected sample is classified into the sample category of Lot C 553. The system may identify the manufacturing processes for the sample 562 and 563 as problematic (even though their process parameters are within the requirement ranges) because they have higher defect rates and failure rates. The system may provide these measurement results as closed-loop feedback information to the manufacturing process and cause one or more process parameters (e.g., intermediate time duration, chamber temperature) to be adjusted so that the any future products may have higher quality with lower defect rate and lower failure rate.

In particular embodiments, the system may cause manufacturing process parameters to be adjusted based on failure analysis results of the failed components. The system may use a machine-learning model to extract one or more features associated with the failed components from one or more associated X-ray images. The system may use the machine-learning model to classify the failed components into one or more categories based on the extracted one or more features. Each sample category may correspond to a manufacturing process with a number of process parameters (e.g., a time duration before putting the inspected sample into a heating chamber and a temperature of the heating chamber during the manufacturing process). The machine-learning model may be trained based on previously inspected samples with known categories. The system may use the machine-learning model to determine a quantified similarity metric between the failed components and a number of previously inspected samples of the sample category. The system may use the machine-learning model to predict a probability of failure for the previously inspected components based on the quantified similarity metric. The probability of failure may be determined based on a defective rate or a failure rate associated with the failed components. In particular embodiments, the system may determine a defective rate or failure rate for a number of samples that are not inspected by the X-ray inspection system. These uninspected samples may be manufactured using the same manufacturing process with the same process parameters to the inspected sample.

In particular embodiments, the system may send feedback information to the bonding tool and cause the bonding tool to adjust one or more process parameters (e.g., a time duration before putting the inspected sample into a heating chamber and a temperature of the heating chamber during the manufacturing process). In particular embodiments, the feedback (or feedforward) information sent to another tool of the manufacturing process may include, for example, but is not limited to, instructions to adjust particular parameters, identified defects in the inspected samples, metrology information determined based on X-ray images, one or more features of failed components, drifts or trends of one or more sample parameters, etc. For example, the system may the feedback information to a bonding tool to cause the bonding tool to adjust the time duration before putting the inspected sample into the heating chamber and the temperature of the heating chamber during the manufacturing process. In particular embodiments, the system may feedback information to an operator of a bonding tool to cause the bonding tool to adjust one or more parameters of the process parameters by the operator. In particular embodiments, the system may cause the manufacturing process to be stopped and cause the bonding tool to adjust its parameters automatically. In particular embodiments, the system may send instructions to the bonding tool to cause the bonding to automatically adjust one or more process parameter without stopping the bonding tool from process subsequent samples.

Adjust X-ray Inspection Algorithm to Reduce False Positives

False Positive and Over Rejections

In particular embodiments, the X-ray inspection system may use an X-ray inspection algorithm (e.g., ML models, rule-based algorithms, computer vision algorithms or any suitable sample classification algorithms) to classify the inspected samples into conforming and non-conforming samples. In some scenarios, the X-ray inspection algorithm may incorrectly classify non-conforming samples as conforming samples (e.g., fail to detect some defects). In these cases, the X-ray inspection algorithm may be adjusted to increase the sensitivity for detecting defects based on new information (e.g., returned failed samples from field applications) as described in earlier sections of this disclosure. In some scenarios, the X-ray inspection system may incorrectly classify some conforming samples as non-conforming samples (i.e., false positives) and have a certain over-rejection rate. The X-ray inspection algorithm may be adjusted based on the new information (e.g., conforming samples as tested by electrical testing, false positive samples as corrected by the electrical testing, etc.) to reduce the over-rejection rate (e.g., reduce the false positive samples), as will be described in later sections of this disclosure.

Initial X-Ray Inspection

In particular embodiments, the X-ray inspection system may inspect a number of manufactured samples during or after the manufacturing process. The X-ray inspection may incorrectly classify and label some conforming samples as non-conforming samples (i.e., false positive samples) during this initial X-ray inspection process. The X-ray inspection system may store the X-ray inspection data (e.g., original X-ray images or other related data) in a database. These false positive samples may be analyzed during a subsequent analysis process, for example, using electrical testing, and may be correctly identified and re-labeled as conforming samples. The system may access the original X-ray images of these samples from the database and use the accessed X-ray images to adjust the X-ray inspection algorithm to reduce the over-rejection rate (i.e., reduce the number of future false positive samples). In particular embodiments, the X-ray inspection system may inspect a number of manufactured samples during or after the manufacturing process. The X-ray inspection may correctly classify and label some conforming samples as conforming samples during the inspection. The X-ray inspection system may store the X-ray inspection data (e.g., original X-ray images or other related data) in a database. These conforming samples may be analyzed during a subsequent analysis process, for example, using electrical testing, and may be confirmed as conforming samples based on the electrical testing result. The system may access the original X-ray images of these samples from the database and use the accessed X-ray images to adjust the X-ray inspection algorithm to reduce the over-rejection rate (i.e., reduce the false positive samples).

Training Samples to Adjust X-ray Inspection Algorithm

In particular embodiments, an X-ray inspection system may access a first set of X-ray images of one or more first samples that are labeled as being conforming. In particular embodiments, the first samples may be conforming samples as confirmed by the electrical testing result or may be the false positive samples that are incorrectly labeled as non-conforming and are correctly re-labeled as conforming based on the electrical testing (or any suitable testing) results. In particular embodiments, the first set of X-ray images of the one or more first samples that are labeled as being conforming may be captured by the X-ray inspection system during an initial X-ray inspection process during or after a manufacturing process of the one or more first samples and before the one or more first samples are re-labeled as being conforming. In particular embodiments, the system may, prior to accessing the first set of X-ray images, inspect the one or more first samples with the X-ray inspection system. The system may indicate the one or more first samples are non-conforming. The system may identify the one or more first samples as being conforming during a subsequent analysis process (e.g., by electrical testing or any suitable test). The system may label the first set of X-ray images of the one or more first samples as being conforming responsive to the identifying the one or more first samples as being conforming during the subsequent analysis process. The system may adjust a classification algorithm based on the first set of X-ray images. The adjusted classification algorithm may be used to classify subsequent samples into conforming or non-conforming categories based on an analysis of corresponding X-ray images and may have a lower over-rejection rate (e.g. a lower probability for false positive samples).

Indicative Features

In particular embodiments, the system may determine, based on the first set of X-ray images, one or more indicative features associated with the one or more first samples that are labeled as being conforming. In particular embodiments, the system may capture a third set of X-ray images of the one or more first samples during a subsequent analysis process after the one or more first samples have been labeled as being conforming. The system may compare the third set of X-ray images of the one or more first samples to the first set of X-ray images of the one or more first samples. The one or more indicative features may be determined based on the comparison between the third set of X-ray images and the first set of X-ray images. In particular embodiments, the one or more indicative features may be determined based on the first set of X-ray images and information received from another inspection system used in the subsequent analysis process that labels the one or more first samples as being conforming.

Adjust X-ray Inspection Algorithm

In particular embodiments, the classification algorithm may be a machine-learning model and adjusting the classification algorithm based on the first set of X-ray images may include: re-training the machine-learning model based on the first set of X-ray images of the one or more first samples that are labeled as being conforming or based on the one or more indicative features associated with the one or more first samples. In particular embodiments, the classification algorithm may be a rule-based classification algorithm and adjusting the classification algorithm based on the first set of X-ray images may include: adjusting one or more existing rules of the rule-based classification algorithm based on the one or more indicative features or adding one or more new rules to the rule-based classification algorithm. The one or more new rules may be generated based on the one or more indicative features. In particular embodiments, the X-ray inspection algorithm or sample classification algorithm, once adjusted, may have a lower probability to incorrectly classify conforming samples as non-conforming.

Use Adjusted Algorithm to Re-Examine X-Ray Images in Database

In particular embodiments, the system may analyze a second set of X-ray images of a number of second samples using the adjusted classification algorithm. In particular embodiments, the second samples may include samples that are previously inspected and have been classified as non-conforming by the classification algorithm during a previous analysis (e.g., the initial X-ray inspection process) before the classification algorithm is adjusted. In particular embodiments, the system may identify one or more of the second samples from the second set of X-ray images. Each identified second sample may be classified as conforming by the adjusted classification algorithm. In particular embodiments, the system may capture a third set of X-ray images for one or more third samples. The system may analyze the third set of X-ray images using the adjusted classification algorithm. The system may classify the one or more third samples into conforming or non-conforming categories using the adjusted classification algorithm. The adjusted algorithm may have a lower over-rejection rate (i.e., less false positive results) than the classification algorithm before being adjusted. In particular embodiments, the system may generate a recalling recommendation excluding the identified one or more second samples that are classified as conforming samples by the adjusted classification algorithm.

In particular embodiments, the system may determine a similarity metric for each of the second samples with respect to the one or more first samples that are labeled as being conforming. The system may compare the similarity metrics of the second samples to a pre-determined threshold. The one or more second samples may be identified based on a determination that the similarity metrics associated with the one or more second samples are less than the pre-determined threshold. In particular embodiments, the similarity metric associated with each second sample may be determined based on corresponding distances from that second sample to the one or more first samples that are labeled as being conforming. The distances may be within a N-dimensional feature space as defined by N number of features associated with the second samples or within a M-dimensional process parameter space as defined by M number of process parameters associated with a manufacturing process of the second samples. In particular embodiments, the system may determine a probability of failure for each of the identified second samples being lower than a pre-determined threshold probability. The probability may be determined based on an associated similarity metric and information associated with the one or more first samples that are labeled as being conforming.

Determine Representative Samples for Reliability Tests

In particular embodiments, the system may inspect a number of selected components used in a reliability test as representative components of a component population. The system may analyze the X-ray images of the selected components and the X-ray images of the component population to determine whether the selected components are representative to the component population. As an example and not by way of limitation, the system may determine locations of the selected components and component population within a N-dimensional features space as defined by N number of features or a M-dimensional process parameter space as defined by M number of process parameters. The system may determine the correlation between the selected components and the component population based on the location distribution of the selected components with respect to the component population in the N-dimensional feature space or M-dimensional process parameter space. When the locations of the selected components are relatively uniformly distributed within the point cloud corresponding to the component population, the system may determine that the selected components are representative to the component population. When the locations of the selected components are not uniformly distributed within the point cloud corresponding to the component population (e.g., the selected components being concentrated at a corner of the point cloud corresponding to the component population), the system may determine that the selected components are not representative to the component population. When the selected components are determined to be not representative to the component population, the system may identify and recommend a number of components for the reliability test. The recommended components may be identified based on their location distribution in the N-dimensional feature space or M-dimensional process parameter space with respect to the component pollution and may be representative to the component population.

Example Method

FIG. 6 illustrates an example method 6000 for re-examining X-ray images of previously inspected samples to identify non-conforming samples for recall. The method may begin at step 610, wherein the system may access a first set of X-ray images of one or more non-conforming samples that are labeled as being non-conforming. At step 620, the system may adjust a classification algorithm based on the first set of X-ray images. The classification algorithm may classify samples into conforming or non-conforming categories based on an analysis of corresponding X-ray images. At step 630, the system may analyze a second set of X-ray images of a number of previously inspected samples using the adjusted classification algorithm. The previously inspected samples may have been classified as conforming samples by the classification algorithm during a previous analysis before the classification algorithm is adjusted. At step 640, the system may identify one or more of the second samples from the second set of X-ray images. Each identified second sample may be classified as non-conforming by the adjusted classification algorithm.

In particular embodiments, prior to accessing the first set of X-ray images, the X-ray inspection system may inspect the one or more first samples. The system may indicate the one or more first samples are conforming. During a subsequent failure analysis process after inspecting the one or more first samples and prior to accessing the first set of X-ray images, the system may identify the one or more first samples as being non-conforming. The system may label the one or more first samples and the first set of X-ray images of the one or more first samples as being non-conforming responsive to the identifying the one or more first samples as being non-conforming during the subsequent failure analysis process. As an example and not by way of limitation, during an initial inspection process after the one or more first samples are manufactured and before being shipped or applied to field applications, the system may inspect the one or more first samples by generating and analyzing the first set of X-ray images. The X-ray inspection system may indicate that the one or more first samples are conforming (based on a current classification algorithm). The system may further label the first set of X-ray images of the one or more first samples as being conforming and store the first set of X-ray images in a database. After that, the one or more first samples may be shipped to customers and applied to fields applications. After a period of usage in the field applications, the one or more first samples may fail in the field applications and may be returned from the field application for a subsequent failure analysis. During the subsequent failure analysis, the system may identify the one or more first samples as being non-conforming and label the first set of X-ray images of the one or more first samples as being non-conforming. As another example and not by way of limitation, after a period of time of usage in the field applications or after a period of time of storage without being applied to field applications, the one or more first samples may be returned for a subsequent failure analysis (or quality analysis). During the subsequent failure analysis which is prior to accessing the first set of X-ray images for the re-examination, the system may identify the one or more first samples as being non-conforming. In response to the identifying the one or more first samples as being non-conforming during the subsequent failure analysis, the system may label the one or more first samples and the first set of X-ray images of the one or more first samples as being non-conforming.

In particular embodiments, the system may determine, based on the first set of X-ray images, one or more indicative features correlated to one or more failure modes associated with the one or more non-conforming samples that are labeled as being non-conforming. The one or more non-conforming samples may be labeled as being non-conforming during a failure analysis process of the non-conforming samples. The non-conforming samples may be failed samples returned for failure analysis from field applications. In particular embodiments, the classification algorithm may be a machine-learning model. Adjusting the classification algorithm based on the first set of X-ray images may include: re-training the machine-learning model based on the first set of X-ray images of the one or more non-conforming samples that are labeled as being non-conforming or based on the one or more indicative features correlated to the one or more failure modes of the one or more non-conforming samples. In particular embodiments, the classification algorithm may be a rule-based classification algorithm. Adjusting the classification algorithm based on the first set of X-ray images may include: adjusting one or more existing rules of the rule-based classification algorithm based on the one or more indicative features or adding one or more new rules to the rule-based classification algorithm. The one or more new rules may be generated based on the one or more indicative features correlated to the one or more failure modes of the non-conforming samples. As used here, labeling as conforming or labeling as non-conforming may refer to making any designation that a sample or component is conforming or non-conforming (or non-defective or defective), respectively. Reference to samples that are labeled as being non-conforming may refer to samples that are designated or identified as non-conforming samples in any suitable way. Similarly, reference to samples that are labeled as being conforming may refer to samples that are designated or identified as conforming samples in any suitable ways.

In particular embodiments, the first set of X-ray images of the one or more non-conforming samples that are labeled as being non-conforming may be captured by the X-ray inspection system during an initial X-ray inspection process during or after a manufacturing process of the one or more non-conforming samples and before the one or more non-conforming samples are labeled as being non-conforming. In particular embodiments, the system may capture new X-ray images of the one or more non-conforming samples during a failure analysis process after the one or more non-conforming samples have been labeled as being non-conforming. The one or more failure modes may be determined based on the new X-ray images of the one or more non-conforming samples. The system may compare the third set of X-ray images of the one or more non-conforming samples to the first set of X-ray images of the one or more non-conforming samples. The one or more failure modes may be determined based on the comparison between the third set of X-ray images and the first set of X-ray images. In particular embodiments, the one or more failure modes may be determined based on the first set of X-ray images and information received from another inspection system used in a failure analysis process of the one or more non-conforming samples that are labeled as being non-conforming.

In particular embodiments, the system may determine a similarity metric for each of the previously inspected samples with respect to the one or more non-conforming samples that are labeled as being non-conforming. The system may compare the similarity metrics of the previously inspected samples to a pre-determined threshold. The one or more previously inspected samples may be identified based on a determination that the similarity metrics associated with the one or more previously inspected samples are less than the pre-determined threshold.

In particular embodiments, the similarity metric associated with each previously inspected sample may be determined based on corresponding distances from that previously inspected sample to the one or more non-conforming samples that are labeled as being non-conforming. The distances may be within a N-dimensional feature space as defined by N number of features associated with the previously inspected samples or within a M-dimensional process parameter space as defined by M number of process parameters associated with a manufacturing process of the previously inspected samples. In particular embodiments, the system may predict a probability of failure for each of the identified previously inspected samples or a future failure time based on an associated similarity metric and information associated with the one or more non-conforming samples that are labeled as being non-conforming. The system may predict a possible failure mode for each of the identified previously inspected samples based on the associated similarity metric associated with that previously inspected sample and one or more failure modes associated with the one or more non-conforming samples that are labeled as being non-conforming. In particular embodiments, the system may capture new X-ray images for one or more new samples. The system may analyze the new X-ray images using the adjusted classification algorithm and classify the one or more new samples into conforming or non-conforming categories using the adjusted classification algorithm.

In particular embodiments, the system may send feedback information to a manufacturing tool used in a manufacturing process of new samples. The feedback information may be generated based on information associated with the one or more non-conforming samples that are labeled as being non-conforming. The system may cause the manufacturing tool to adjust one or more process parameters based on the feedback information. The manufacturing tool with the adjusted process parameters may have a lower probability to produce non-conforming samples. In particular embodiments, the system may send feedforward information to a manufacturing tool used in a downstream process of a manufacturing process of new components. The feedforward information may be generated based on information associated with the one or more non-conforming samples that are labeled as being non-conforming. The system may cause the manufacturing tool to adjust one or more process parameters based on the feedforward information. The manufacturing tool with the adjusted process parameters may have a lower probability for producing non-conforming samples.

In particular embodiments, the system may send feedforward information to an inspection tool used in a downstream process of a manufacturing process of new samples. The feedforward information may be generated based on information associated with the one or more non-conforming samples are labeled as being non-conforming. The system may cause the inspection tool to adjust one or more parameters based on the feedforward information. The inspection tool with the adjusted process parameters may reject new samples, that are associated with one or more indicative features correlated to one or more failure modes of the one or more non-conforming samples, as non-conforming. In particular embodiments, the system may cause the inspection tool to perform an additional inspection step. The additional inspection step may identify one or more of the indicative features associated with the new samples. In particular embodiments, the system may generate a recalling recommendation based on the identified one or more previously inspected samples. The identified previously inspected samples may include less samples than a previously inspected sample population used in field applications. In particular embodiments, the system may capture a third set of X-ray images for a number of selected samples that are selected for a reliability test for a sample population. The system may determine, based on the third set of X-ray images, a correlation metric between the selected samples and the sample population based on a N-dimension feature space as defined by N number of features associated with the sample population. The system may determine whether the selected samples are representative to the sample population based on the correlation metric.

In particular embodiments, an X-ray inspection system may access a first set of X-ray images of one or more first samples that are labeled as being conforming. The system may adjust a classification algorithm based on the first set of X-ray images, wherein the classification algorithm classifies samples into conforming or non-conforming categories based on an analysis of corresponding X-ray images. The system may analyze a second set of X-ray images of a number of second samples using the adjusted classification algorithm. The second samples may be previously inspected samples that have been classified as non-conforming by the classification algorithm during a previous analysis before the classification algorithm is adjusted. The system may identify one or more of the second samples from the second set of X-ray images. Each identified second sample may be classified as conforming by the adjusted classification algorithm.

In particular embodiments, the system may, prior to accessing the first set of X-ray images, inspect the one or more first samples with the X-ray inspection system, wherein the X-ray inspection system indicates the one or more first samples are non-conforming. The system may identify the one or more first samples as being conforming during a subsequent analysis process after inspecting the one or more first samples. The system may label the first set of X-ray images of the one or more first samples as being conforming responsive to the identifying the one or more first samples as being conforming during the subsequent analysis process. In particular embodiments, the system may determine, based on the first set of X-ray images, one or more indicative features associated with the one or more first samples that are labeled as being conforming. In particular embodiments, the classification algorithm may be a machine-learning model and adjusting the classification algorithm based on the first set of X-ray images may comprise: re-training the machine-learning model based on the first set of X-ray images of the one or more first samples that are labeled as being conforming or based on the one or more indicative features associated with the one or more first samples. In particular embodiments, the classification algorithm may be a rule-based classification algorithm. Adjusting the classification algorithm based on the first set of X-ray images may comprise: adjusting one or more existing rules of the rule-based classification algorithm based on the one or more indicative features or adding one or more new rules to the rule-based classification algorithm. The one or more new rules may be generated based on the one or more indicative features. In particular embodiments, the first set of X-ray images of the one or more first samples that are labeled as being conforming may be captured by the X-ray inspection system during an initial X-ray inspection process during or after a manufacturing process of the one or more first samples and before the one or more first samples are labeled as being conforming.

In particular embodiments, the system may capture a third set of X-ray images of the one or more first samples during a subsequent analysis process after the one or more first samples have been labeled as being conforming. The system may compare the third set of X-ray images of the one or more first samples to the first set of X-ray images of the one or more first samples, wherein the one or more indicative features are determined based on the comparison between the third set of X-ray images and the first set of X-ray images. In particular embodiments, the one or more indicative features may be determined based on the first set of X-ray images and information received from another inspection system used in the subsequent analysis process that labels the one or more first samples as being conforming. In particular embodiments, the system may determine a similarity metric for each of the second samples with respect to the one or more first samples that are labeled as being conforming. The system may compare the similarity metrics of the second samples to a pre-determined threshold. The one or more second samples may be identified based on a determination that the similarity metrics associated with the one or more second samples are less than the pre-determined threshold. In particular embodiments, the similarity metric associated with each second sample may be determined based on corresponding distances from that second sample to the one or more first samples that are labeled as being conforming. The distances may be within a N-dimensional feature space as defined by N number of features associated with the second samples or within a M-dimensional process parameter space as defined by M number of process parameters associated with a manufacturing process of the second samples. In particular embodiments, the system may determine a probability of failure for each of the identified second samples being lower than a pre-determined threshold probability. The probability may be determined based on an associated similarity metric and information associated with the one or more first samples that are labeled as being conforming. In particular embodiments, the system may capture a third set of X-ray images for one or more third samples. The system may analyze the third set of X-ray images using the adjusted classification algorithm. The system may classify the one or more third samples into conforming or non-conforming categories using the adjusted classification algorithm.

Although this disclosure describes and illustrates particular steps of the method of FIG. 6 as occurring in a particular order, this disclosure contemplates any suitable steps of the method of FIG. 5 occurring in any suitable order. Moreover, although this disclosure describes and illustrates an example method for re-examining X-ray images of previously inspected samples to identify non-conforming samples for recall including the particular steps of the method of FIG. 6, this disclosure contemplates any suitable method for re-examining X-ray images of previously inspected samples to identify non-conforming samples for recall including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Advantages: Inspection Speed

A significant advantage of this invention is that an extended source of X-rays can be used, increasing the available flux of X-rays used for imaging. This in turn increases the throughput possible for the system. Put another way, in the time to acquire a single inspection image with a PPM system, the proposed invention can acquire over 300,000 images with the same resolution.

Consider the following comparison with the PPM X-ray system. The time to acquire an image depends on the flux $\Phi$ of X-rays:

$$T_{acquire} = P_{\#} \times X_P / \Phi$$

where $P_{\#}$ is the number of pixels, $X_P$ is the number of X-rays per pixel, and $\Phi$ is the X-ray flux. The X-ray flux from a point source is:

$$\text{Flux} = \Phi = \beta \times \Omega \times S_A$$

where $\beta$ is the point source brightness, $\Omega$ is the angular distribution in mrad$^2$ and $S_A$ is the point source area $S_A = \pi r^2$. The source spot size for X-ray systems is typically defined using the ASTM standard SE-1165 ["Standard Test Method for Measurement of Focal Spots of Industrial X-ray Tubes by Pinhole Imaging," ASTM Committee E-7 on Nondestructive Testing, May 15, 1992].

A typical X-ray source brightness β is $\beta = 10^8$ X-rays/sec/mm²/mrad².

To avoid parallax errors in automated inspection, the PPM X-ray beam should be well collimated; a divergence of 20 mrad is typical. For a point source with $\Omega = (20 \text{ mrad})^2 = 400 \text{ mrad}^2$ and a source spot diameter d=2r=1 μm=$10^{-3}$ mm, the flux is given by:

Flux=Φ=β×Ω×$S_A$

=$10^8$×400×π×[0.5×$10^{-3}$]² X-rays/sec

=400×π×0.25×$10^8$×[$10^{-3}$]² X-rays/sec

=400×π×25 X-rays/sec

=31,416=3.14×$10^4$ X-rays/sec.

A typical X-ray image sensor may have 512×512 pixels that need 1,000 X-rays/pixel for image formation. An image for a PPM system will therefore be collected in approximately 8,350 seconds, or 2.3 hours.

On the other hand, keeping the same source brightness, but illuminating with a larger source spot size according to the invention dramatically increases the X-ray flux illuminating the object. As an example, assume a source with a 1 mm diameter (r=0.5 mm) separated by 100 mm from the object and, furthermore, assume that the distance from the object to scintillator is 100 microns. The angular divergence of the X-ray beam is given by:

α=1 mm/100 mm=10 mrad, making $Q = 100 \text{ mrad}^2$.

The spot area is =π×[0.5]²=0.785 mm², so the flux becomes:

Flux=Φ=$10^8$×100×0.785 photons/sec

=7.85×$10^9$ photons/sec which is higher than the PPM configuration by a factor of 250,000 times. Therefore, the same 512×512 image (with 1,000 X-rays per pixel) can now be produced at high speed and, for example, may now have a proportionally faster image collection time of approximately 33 msec.

As a practical matter, the throughput enhancement may be further reduced by a factor of between 2 and 10 from this number. A PPM imaging system can detect X-rays in the enlarged shadow image directly with a CCD X-ray detector, which can have a quantum efficiency between 50% to 100%. The typical X-ray CCD array comprises an array of pixels, with a pixel size of approximately 100 μm×100 μm.

In comparison, the high-resolution direct-shadow images for the system of the disclosed invention come from an extended X-ray source, and are not magnified. The pixels of contemporary X-ray imaging detectors are far too large to resolve the proximity images. Instead, the invention disclosed here comprises a scintillator to convert the X-rays to optical photons, and then magnifies this optical image.

In order to achieve a particular resolution, there may be thickness specifications for the scintillator. For a resolution of 1 micron, for example, the scintillator may have a specified thickness between 1 and 10 microns. For thin scintillators, some of the incident X-rays will pass through the scintillator without being absorbed. Therefore, the quantum efficiency of this conversion process may worse than the PPM system, emitting visible photons for approximately 20% of the X-rays passing through the scintillator. Beyond this, the microscope may lose additional photons, depending on the optical system NA and the quantum efficiency of the visible CCD detector. However, even with these losses, the benefit provided by the higher flux of the extended source still provides a significant advantage.

Advantages: Imaging Resolution

The resolution of the prior art PPM system is determined by the spot size of the X-ray source. For example, a source with a 1 micron spot size will produce images with 1 micron resolution, assuming the system is operating at optimal resolution. Practically speaking, it is difficult to achieve resolution much below 1 micron with a PPM system, due to rapidly decreasing efficiency of the X-ray source for small spot sizes. As the spot size of the X-ray source decreases, the X-ray power must be reduced to avoid melting the X-ray target. Furthermore, the X-ray target must be made thinner, to reduce scattering in the target. As a result, for each 2× decrease in spot size, the flux from the source decreases a factor of about 2× to 4×. Overall, the throughput will decrease at least 8× for a 2× improvement in resolution.

For the imaging system according to the invention, the scintillator is in close proximity to the object being examined, and photons emitted are in proportion to the X-rays. For the optical system that relays the photons emitted by the scintillator to the detector, assuming a scintillator emission wavelength of λ=535 nm and a solid immersion optical system with NA 1.75 comprising LuAG optical elements with refractive index n=1.84, the definition for the diffraction-limited resolution R of the optical system relaying scintillator photons to the detector is:

$$R = \frac{\lambda}{2 * NA} = \frac{535 \text{ nm}}{2 * 1.75} = 153 \text{ nm}$$

which is 6.5 times smaller than the 1 micron resolution of the PPM system.

Advantages: Time to Market

The high speed at which non-destructive images at resolutions smaller than 50 microns can be gathered can improve the time to market for the development of manufacturing processes such as the flip chip interconnect (FCI) process described earlier. The destructive processes for failure analysis, also described earlier, can take weeks to collect a single image, and months to acquire statistical data on parts. Because of the rapid time in which images can be collected and analyzed using the system of the present invention, process development time for such products can be counted in days, and is typically a fraction of the total time required to design and bring to market a new product.

Furthermore, because of the enhanced resolution, the present invention can be used for the new FCI processes with pitches smaller than 50 microns. The present invention can be used for significantly smaller pitches, and still maintain the desired image resolution and speed. In terms of the product development cycle, an increase in time for feedback of one to several weeks has a distinct and significant impact on the time required to develop a new product. In a simple case, perhaps three to five cycles of setup and data collection may be sufficient to establish a process for a new device. In a more complex case, such as a high-density interposer or a 3D IC, tens or hundreds of iterations may be required. Without the present invention, each of these cycles may take several weeks, and the total time to market of the product may come to be dominated by these cycles. Clearly a method of determining the quality of fine pitch (50 microns and smaller) bonds at the time of processing offers a significant advantage.

The images and calculations produced by the system and methods disclosed herewith allow the quality of bonds to be examined immediately after bonding in a matter of seconds or minutes. In order to develop and qualify a new semiconductor product for mass production, many individual processes and the integration of these processes must be established, tuned, and tested. In the case of forming a through-silicon via (TSV) in a semiconductor wafer, the process flow typically requires that the vias be formed first and the capture pads be subsequently formed on the wafer surface over the vias. Since the capture pads obscure optical inspection of the vias themselves, in the absence of the present invention, the alignment between the vias and the capture pads may not be accurately determined at the time of manufacturing without cutting the silicon wafer and inspecting this feature in cross-section. Since this procedure is time consuming and also destroys the silicon wafer and any economic value contained within it, it is therefore undesirable.

In the case of bonding two or more chips or substrates or even complete wafers together using FCI, the alignment, bonding force, bonding temperature, rate of heating, and rate of cooling among other factors must be tightly controlled. While control of manufacturing equipment and processes can enable some of the necessary control, inspection and measurement of features within the product that are not optically visible may also be required. Without the use of the apparatus disclosed in this invention, assembled parts must be cross-sectioned in order to be inspected. Given the fine pitch of the interconnect bonds and the very large quantity of connections, this procedure can take several weeks. Typically only a very small subset of the total interconnect bonds may actually be inspected.

The inability to inspect bonds quickly can add significantly to the length of time required to fine tune both individual process steps as well as the integration of multiple process steps to create a finished product. For example, consider a case where 25 iterations of the bonding process are required to develop and qualify a product. In the case without the apparatus disclosed in this invention, each iteration may require 1 week to build each group of samples under various process and tooling configurations. After manufacturing a group of samples, an additional 2 weeks may be required to cross-section individual units and inspect the quality and attributes of the bonds that have been created. The total time is therefore: 25 cycles×(1 week making+2 weeks inspection)=75.0 weeks.

With the use of the apparatus disclosed in this invention, the 2 weeks of inspection can be reduced to a few minutes by eliminating the need for time consuming cross-sectioning. The total time for the sequential cycles may now be calculated as: 25 cycles×(1 week making+1 hour inspection) =25.15 weeks, a reduction by 49.85 weeks (or 66% of the initial time to market). With high-volume consumer electronic devices such as mobile phones selling in volumes of more than 100 million units a year, it can be easily seen that a decrease in time to market by 50 weeks (almost one year) can have significant impact on the market. The apparatus may further be integrated into the bonding tool or via filling tool, for example the electrochemical deposition tool, to provide feedback to the bonding process in real time. The use of the apparatus in this way reduces time to market by many weeks and may in fact enable a product to enter the market that otherwise would be too costly or too late to market to have economic value.

Advantages: Product Yield and Cost

It has been reported that commercial production began on these devices with overall yields related to package assembly and interconnect in the range of 80%. This yield is far lower than typically accepted in the semiconductor field, and there is considerable additional cost associated with the scrap material. However, this particular part was determined to have such high commercial value that, even considering the cost associated with low yield, it was commercially feasible to produce with only 80% package assembly yield. In other lower-cost, more consumer-oriented segments of the market, pressure on pricing is much more intense, and it is unlikely that a product with package assembly yields at this level could be commercially viable. For this reason, it is necessary for the manufacturing process to be highly capable and tightly controlled, such that the amount of scrap product or yield loss resulting from the bonding process is reduced. Traditionally, package assembly yields are in the 98 to 99% range. Those skilled in the art will quickly realize that scrapping good chips by using poorly yielding bonding techniques, and packaging yields of 80% for lower value chips, are simply not acceptable.

It should be noted that, in the case of multiple dice mounted together either as a 3D IC or onto a high-density interposer, the failure of one connection on any chip will result in the scrapping of the entire MCP or package assembly. There may be thousands or tens of thousands of connections that must all function as designed. It is rare that any kind of rework or recovery of materials can be accomplished if any of the bonds are not produced correctly. For example, take the case when a processor chip with a cost of $10 is mounted together with four memory chips costing $5 each, or $20. The total cost of the chips is therefore $30. Chip assembly and packaging may add another $5 of cost for a total assembly cost of $35.

By using the images and measurements produced by the apparatus in this disclosure, the processes of aligning, inspection bonding can be controlled and monitored such that the yield can be rapidly increased. For MCP packages, in the example above, detecting a flaw between the first two dice will allow the packaging assembler to scrap the first two die only, and not require the loss of all five dice, therefore saving scrap costs and improving yield. It is common for well-controlled and monitored assembly processes to have yields of over 99.9%. The present invention allows a packaging assembler to achieve a yield of greater than or equal to 90% in MCP structures having more than 4 dice and having more than 100 TSVs per interposer or die layer at pitches where the smallest pitch is less than 100 microns. The same yield advantage may be achieved in the flip chip configuration having more than 400 microbumps at a pitch where the smallest pitch is less than 100 microns.

This same advantage in cost and yield can be seen at other steps in the manufacturing process for fine-pitch interposers and 3D die stacking, such as via fill monitor for voids, via capture pad alignment to via, alignment of chip-bump to chip or interposer pad, and quality of completed joint after bonding. It may also be used to measure bondline in the assembly of multiple slices of silicon devices or fine pitch interposers or between silicon devices and other materials of interest where this bondline thickness is critical to device performance.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an X-ray inspection system:
accessing a first set of X-ray images, captured using the X-ray inspection system, of one or more first samples that are labeled as being non-conforming based on a failure of each of the first samples in a field application;
adjusting a classification algorithm based on the first set of X-ray images, wherein the classification algorithm classifies samples into conforming or non-conforming categories based on an analysis of corresponding X-ray images;
analyzing a second set of X-ray images of a plurality of second samples using the adjusted classification algorithm in the X-ray inspection system, wherein the second samples are previously inspected samples that have been classified as conforming by the classification algorithm during a previous analysis using the X-ray inspection system before the classification algorithm is adjusted; and
identifying one or more of the second samples from the second set of X-ray images, wherein each identified second sample is classified as non-conforming by the adjusted classification algorithm.

2. The method of claim 1, further comprising, prior to accessing the first set of X-ray images:
inspecting the one or more first samples with the X-ray inspection system, wherein the X-ray inspection system indicates the one or more first samples are conforming;
identifying the one or more first samples as being non-conforming during a subsequent failure analysis process after inspecting the one or more first samples; and
labeling the first set of X-ray images of the one or more first samples as being non-conforming responsive to the identifying the one or more first samples as being non-conforming during the failure analysis process.

3. The method of claim 1, further comprising:
determining, based on the first set of X-ray images, one or more indicative features correlated to one or more failure modes associated with the one or more first samples that are labeled as being non-conforming.

4. The method of claim 3, wherein the classification algorithm is a machine-learning model, and wherein adjusting the classification algorithm based on the first set of X-ray images comprises:
re-training the machine-learning model based on the first set of X-ray images of the one or more first samples that are labeled as being non-conforming or based on the one or more indicative features correlated to the one or more failure modes of the one or more first samples.

5. The method of claim 3, wherein the classification algorithm is a rule-based classification algorithm, and wherein adjusting the classification algorithm based on the first set of X-ray images comprises:
adjusting one or more existing rules of the rule-based classification algorithm based on the one or more indicative features; or
adding one or more new rules to the rule-based classification algorithm, wherein the one or more new rules are generated based on the one or more indicative features.

6. The method of claim 3, wherein the first set of X-ray images of the one or more first samples that are labeled as being non-conforming are captured by the X-ray inspection system during an initial X-ray inspection process during or after a manufacturing process of the one or more first samples and before the one or more first samples are labeled as being non-conforming.

7. The method of claim 6 further comprising:
capturing a third set of X-ray images of the one or more first samples during a failure analysis process after the one or more first samples have been labeled as being non-conforming; and
determining the one or more failure modes based on the third set of X-ray images of the one or more first samples.

8. The method of claim 7, further comprising:
comparing the third set of X-ray images of the one or more first samples to the first set of X-ray images of the one or more first samples; and
determining the one or more failure modes based on the comparison between the third set of X-ray images and the first set of X-ray images.

9. The method of claim 3, further comprising:
determining the one or more failure modes based on the first set of X-ray images and information received from another inspection system used in a failure analysis process of the one or more first samples that are labeled as being non-conforming.

10. The method of claim 1, further comprising:
determining a similarity metric for each of the plurality of second samples with respect to the one or more first samples that are labeled as being non-conforming; and
comparing the similarity metrics of the plurality of second samples to a pre-determined threshold, wherein the one or more second samples are identified based on a determination that the similarity metrics associated with the one or more second samples are less than the pre-determined threshold.

11. The method of claim 10, wherein the similarity metric associated with each second sample is determined based on corresponding distances from that second sample to the one or more first samples that are labeled as being non-conforming, wherein the distances are within a N-dimensional feature space as defined by N number of features associated with the plurality of second samples or within a M-dimensional process parameter space as defined by M number of process parameters associated with a manufacturing process of the plurality of second samples.

12. The method of claim 10, further comprising:
predicting a probability of failure for each of the identified second samples or a future failure time based on an associated similarity metric and information associated with the one or more first samples that are labeled as being non-conforming; and
predicting a possible failure mode for each of the identified second samples based on the associated similarity metric associated with that second sample and one or more failure modes associated with the one or more first samples that are labeled as being non-conforming.

13. The method of claim 1, further comprising:
capturing a third set of X-ray images for one or more third samples;
analyzing the third set of X-ray images using the adjusted classification algorithm; and
classifying the one or more third samples into conforming or non-conforming categories using the adjusted classification algorithm.

14. The method of claim 1, further comprising:
sending feedback information to a manufacturing tool used in a manufacturing process of new samples, wherein the feedback information is generated based on information associated with the one or more first samples that are labeled as being non-conforming; and
causing the manufacturing tool to adjust one or more process parameters based on the feedback information, wherein the manufacturing tool with the adjusted process parameters has a lower probability of producing non-conforming samples.

15. The method of claim 1, further comprising:
sending feedforward information to a manufacturing tool used in a downstream process of a manufacturing process of new samples, wherein the feedforward information is generated based on information associated with the one or more first samples that are labeled as being non-conforming; and
causing the manufacturing tool to adjust one or more process parameters based on the feedforward information, wherein the manufacturing tool with the adjusted process parameters has a lower probability of producing non-conforming samples.

16. The method of claim 1, further comprising:
sending feedforward information to an inspection tool used in a downstream process of a manufacturing process of new samples, wherein the feedforward information is generated based on information associated with the one or more first samples that are labeled as being non-conforming; and
causing the inspection tool to adjust one or more parameters based on the feedforward information, wherein the inspection tool with the adjusted process parameters rejects new samples, that are associated with one or more indicative features correlated to one or more failure modes of the one or more first samples, as non-conforming.

17. The method of claim 16, further comprising:
causing the inspection tool to perform an additional inspection step, wherein the additional inspection step identifies one or more of the indicative features associated with the new samples.

18. The method of claim 1, further comprising:
generating a recalling recommendation based on the identified one or more second samples, wherein the identified second samples comprise less samples than a sample population used in field applications.

19. The method of claim 1, further comprising:
capturing a third set of X-ray images for a plurality of third samples that are selected for a reliability test for a sample population;
determining, based on the third set of X-ray images, a correlation metric between the plurality of third samples and the sample population based on a N-dimension feature space as defined by N number of features associated with the sample population; and
determining whether the plurality of third samples are representative to the sample population.

20. One or more computer-readable non-transitory storage media embodying software that is operable when executed to:
access a first set of X-ray images, captured using the X-ray inspection system, of one or more first samples that are labeled as being non-conforming based on a failure of each of the first samples in a field application;
adjust a classification algorithm based on the first set of X-ray images, wherein the classification algorithm classifies samples into conforming or non-conforming categories based on an analysis of corresponding X-ray images;
analyze a second set of X-ray images of a plurality of second samples using the adjusted classification algorithm, wherein the second samples are previously inspected samples that have been classified as conforming by the classification algorithm during a previous analysis using the X-ray inspection system before the classification algorithm is adjusted; and
identify one or more of the second samples from the second set of X-ray images, wherein each identified second sample is classified as non-conforming by the adjusted classification algorithm.

21. A system comprising: one or more processors; and one or more computer-readable non-transitory storage media coupled to one or more of the processors and comprising instructions operable when executed by one or more of the processors to cause the system to:
access a first set of X-ray images, captured using the X-ray inspection system, of one or more first samples that are labeled as being non-conforming based on a failure of each of the first samples in a field application;
adjust a classification algorithm based on the first set of X-ray images, wherein the classification algorithm classifies samples into conforming or non-conforming categories based on an analysis of corresponding X-ray images;
analyze a second set of X-ray images of a plurality of second samples using the adjusted classification algorithm in the X-ray inspection system, wherein the second samples are previously inspected samples that have been classified as conforming by the classification algorithm during a previous analysis using the X-ray inspection system before the classification algorithm is adjusted; and
identify one or more of the second samples from the second set of X-ray images, wherein each identified second sample is classified as non-conforming by the adjusted classification algorithm.

22. A method comprising, by an X-ray inspection system:
accessing a first set of X-ray images, captured using the X-ray inspection system, of one or more first samples that are labeled as being conforming based on a failure of each of the first samples in a field application;
adjusting a classification algorithm based on the first set of X-ray images, wherein the classification algorithm classifies samples into conforming or non-conforming categories based on an analysis of corresponding X-ray images;
analyzing a second set of X-ray images of a plurality of second samples using the adjusted classification algorithm in the X-ray inspection system, wherein the second samples are previously inspected samples that have been classified as non-conforming by the classification algorithm during a previous analysis using the X-ray inspection system before the classification algorithm is adjusted; and
identifying one or more of the second samples from the second set of X-ray images, wherein each identified second sample is classified as conforming by the adjusted classification algorithm.

23. The method of claim 22, further comprising, prior to accessing the first set of X-ray images:
inspecting the one or more first samples with the X-ray inspection system, wherein the X-ray inspection system indicates the one or more first samples are non-conforming;
identifying the one or more first samples as being conforming during a subsequent analysis process after inspecting the one or more first samples; and
labeling the first set of X-ray images of the one or more first samples as being conforming responsive to the identifying the one or more first samples as being conforming during the subsequent analysis process.

24. The method of claim 22, further comprising:
determining, based on the first set of X-ray images, one or more indicative features associated with the one or more first samples that are labeled as being conforming.

25. The method of claim 24, wherein the classification algorithm is a machine-learning model, and wherein adjusting the classification algorithm based on the first set of X-ray images comprises:
re-training the machine-learning model based on the first set of X-ray images of the one or more first samples that are labeled as being conforming or based on the one or more indicative features associated with the one or more first samples.

26. The method of claim 24, wherein the classification algorithm is a rule-based classification algorithm, and wherein adjusting the classification algorithm based on the first set of X-ray images comprises:
adjusting one or more existing rules of the rule-based classification algorithm based on the one or more indicative features; or
adding one or more new rules to the rule-based classification algorithm, wherein the one or more new rules are generated based on the one or more indicative features.

27. The method of claim 24, wherein the first set of X-ray images of the one or more first samples that are labeled as being conforming are captured by the X-ray inspection system during an initial X-ray inspection process during or after a manufacturing process of the one or more first samples and before the one or more first samples are labeled as being conforming.

28. The method of claim 27 further comprising:
capturing a third set of X-ray images of the one or more first samples during a subsequent analysis process after the one or more first samples have been labeled as being conforming; and
comparing the third set of X-ray images of the one or more first samples to the first set of X-ray images of the one or more first samples, wherein the one or more indicative features are determined based on the comparison between the third set of X-ray images and the first set of X-ray images.

29. The method of claim 24, wherein the one or more indicative features are determined based on the first set of X-ray images and information received from another inspection system used in the subsequent analysis process that labels the one or more first samples as being conforming.

30. The method of claim 22, further comprising:
determining a similarity metric for each of the plurality of second samples with respect to the one or more first samples that are labeled as being conforming; and
comparing the similarity metrics of the plurality of second samples to a pre-determined threshold, wherein the one or more second samples are identified based on a determination that the similarity metrics associated with the one or more second samples are less than the pre-determined threshold.

31. The method of claim 30, wherein the similarity metric associated with each second sample is determined based on corresponding distances from that second sample to the one or more first samples that are labeled as being conforming, wherein the distances are within a N-dimensional feature space as defined by N number of features associated with the plurality of second samples or within a M-dimensional process parameter space as defined by M number of process parameters associated with a manufacturing process of the plurality of second samples.

32. The method of claim 31, further comprising:
determining a probability of failure for each of the identified second samples being lower than a pre-determined threshold probability, wherein the probability is determined based on an associated similarity metric and information associated with the one or more first samples that are labeled as being conforming.

33. The method of claim 22, further comprising:
capturing a third set of X-ray images for one or more third samples;
analyzing the third set of X-ray images using the adjusted classification algorithm; and
classifying the one or more third samples into conforming or non-conforming categories using the adjusted classification algorithm.

34. One or more computer-readable non-transitory storage media embodying software that is operable when executed to:
access a first set of X-ray images, captured using the X-ray inspection system, of one or more first samples that are labeled as being conforming based on a failure of each of the first samples in a field application;
adjust a classification algorithm based on the first set of X-ray images, wherein the classification algorithm classifies samples into conforming or non-conforming categories based on an analysis of corresponding X-ray images;
analyze a second set of X-ray images of a plurality of second samples using the adjusted classification algorithm in the X-ray inspection system, wherein the second samples are previously inspected samples that have been classified as non-conforming by the classification algorithm during a previous analysis using the X-ray inspection system before the classification algorithm is adjusted; and identify one or more of the second samples from the second set of X-ray images, wherein each identified second sample is classified as conforming by the adjusted classification algorithm.

35. A system comprising: one or more processors; and one or more computer-readable non-transitory storage media coupled to one or more of the processors and comprising instructions operable when executed by one or more of the processors to cause the system to:

access a first set of X-ray images, captured using the X-ray inspection system, of one or more first samples that are labeled as being conforming based on a failure of each of the first samples in a field application;

adjust a classification algorithm based on the first set of X-ray images, wherein the classification algorithm classifies samples into conforming or non-conforming categories based on an analysis of corresponding X-ray images;

analyze a second set of X-ray images of a plurality of second samples using the adjusted classification algorithm in the X-ray inspection system, wherein the second samples are previously inspected samples that have been classified as non-conforming by the classification algorithm during a previous analysis using the X-ray inspection system before the classification algorithm is adjusted; and identify one or more of the second samples from the second set of X-ray images, wherein each identified second sample is classified as conforming by the adjusted classification algorithm.

* * * * *